(12) United States Patent
Nagatoshi et al.

(10) Patent No.: US 8,937,773 B2
(45) Date of Patent: Jan. 20, 2015

(54) PROJECTION LENS AND PROJECTION DISPLAY APPARATUS

(71) Applicant: Fujifilm Corporation, Tokyo (JP)

(72) Inventors: Yukiko Nagatoshi, Saitama-ken (JP); Tomoyuki Baba, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/226,220

(22) Filed: Mar. 26, 2014

(65) Prior Publication Data

US 2014/0307327 A1    Oct. 16, 2014

(30) Foreign Application Priority Data

Apr. 12, 2013   (JP) .................................. 2013-083661

(51) Int. Cl.
*G02F 1/03*     (2006.01)
*G02B 13/04*    (2006.01)

(52) U.S. Cl.
CPC ..................................... *G02B 13/04* (2013.01)
USPC ......................................................... 359/649

(58) Field of Classification Search
USPC .......................................................... 359/649
See application file for complete search history.

(56) References Cited

U.S. PATENT DOCUMENTS

| 7,184,219 | B2 | 2/2007 | Kobayashi |
| 8,437,093 | B2 | 5/2013 | Matsuo |
| 2010/0039711 | A1* | 2/2010 | Kang et al. ................... 359/716 |

FOREIGN PATENT DOCUMENTS

| JP | 4683944 | 2/2011 |
| JP | 2012-220875 | 11/2012 |

* cited by examiner

*Primary Examiner* — James Jones
(74) *Attorney, Agent, or Firm* — Young & Thompson

(57) ABSTRACT

A projection lens that projects image information displayed on the reduction side conjugate position onto the magnification side conjugate position includes an aspherical lens having a positive refractive power that satisfies predetermined conditional expressions and, when the back focus of the entire system is taken as Bf, the focal length of the entire system is taken as f, the maximum effective image circle diameter on the reduction side is taken as Im$\phi$, and the distance from the reduction side conjugate position to the reduction side pupil position is taken as dexp, satisfies conditional expressions (6): Bf/f>2 and (7): 0.5<|Im$\phi$/dexp|<1.

15 Claims, 15 Drawing Sheets

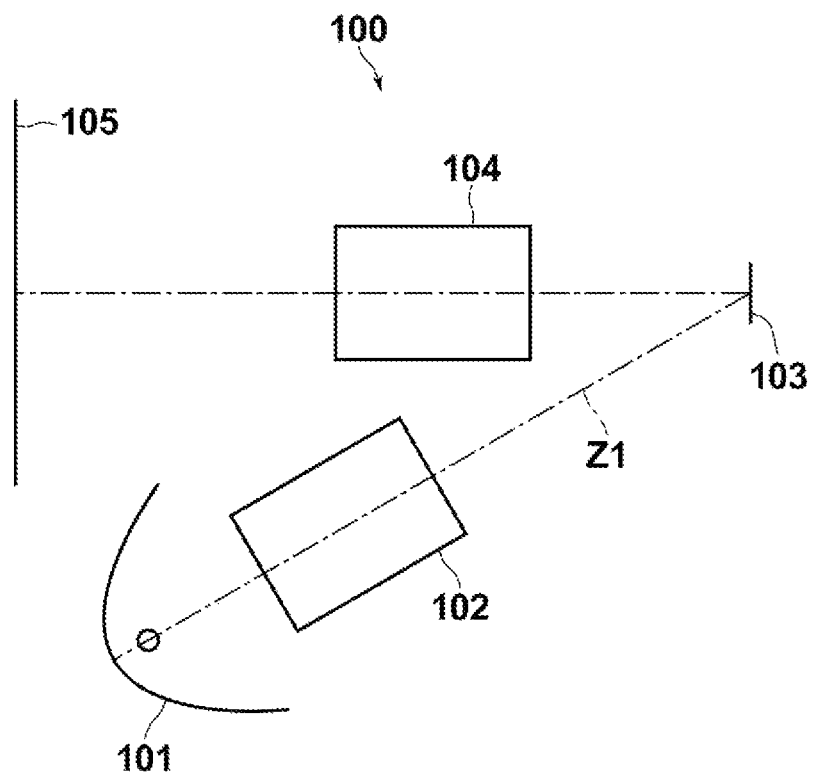

PROJECTION LENS AND PROJECTION DISPLAY APPARATUS

BACKGROUND OF THE INVENTION

1. Field of the Invention

The present invention relates to a projection lens and a projection display apparatus, and more specifically to a projection lens preferably used for magnifying and projecting an original image formed, for example, by a light valve onto a, screen, and a projection display apparatus using the same.

2. Description of the Related Art

Recently, projection projectors (projection display apparatuses) that use a DMD (Digital Micro-mirror Device: registered trade mark) display device as the light valve have been used instead of liquid crystal display apparatuses. Unlike liquid crystal display apparatuses, DMD display apparatuses have less amount of light loss as they do not need to polarize the projected light and are superior in accuracy of gray-scale representation over crystal display apparatuses. In a projection display apparatus, the DMD controls the reflection directions of light from the light source according to inputted video signals using high reflectance small rectangular mirrors capable of changing the inclination within a range of about 10 degrees or more to focus only the desired reflection light beams on a screen, thereby enabling projection of the image. This is achieved by arranging, for example, several millions of mirrors on a substrate and digitally controlling all of the mirrors independently, in which each mirror corresponds to each pixel of the projected image.

As for the projection lenses applicable to projection display apparatuses that use a DMD as the light valve, those described in Japanese Unexamined Patent Publication No. 2012-220875 and Japanese Patent No. 4683944 are proposed. Japanese Unexamined Patent Publication No. 2012-220875 describes a projection lens formed of 10 or 11 lenses in which aspherical plastic lenses are used for the most magnification side lens and the third lens from the magnification side. Japanese Patent No. 4683944 describes a projection lens formed of 14 lenses in which an aspherical plastic lens is disposed on the most magnification side.

SUMMARY OF THE INVENTION

As the DMD display device has the aforementioned advantage, projection display apparatuses that use a DMD display device demand a projection lens having such optical characteristics as to be able to project vivid high resolution images appropriate for the DMD display apparatuses. Further, the projection lens is required to have a wide angle of view to allow projection of large images at short projection distances in small rooms. Wide angle projection lenses have an advantage that the screen size can be adjusted by changing the distance between the screen and the apparatus only by a small amount, since they have a large change in the screen size with respect to a change in the projection distance in comparison with narrow angle projection lenses. In addition to the aforementioned demand, the projection lenses are further required to have a compact configuration with low cost in line with the recent growing demand for mobile applications and price reduction of projection display apparatuses.

The projection lens described in Japanese Unexamined Patent Publication No. 2012-220875, however, cannot be said that various aberrations including longitudinal chromatic aberration, astigmatism, and the like, are corrected sufficiently. The projection lens described in Japanese Patent No. 4683944 may require further extension of angle of view in order to respond to the recent demand.

The present invention has been developed in view of the circumstances described above and it is an object of the present invention to provide a projection lens increased in angle of view, well corrected in aberrations, and capable of providing favorable projection performance, while maintaining a compact configuration with reduced cost. It is a further object of the present invention to provide a projection display apparatus provided with such a projection lens.

A projection lens of the present invention projects image information displayed on the reduction side conjugate position onto the magnification side conjugate position, the projection lens
 including an aspherical lens having a positive refractive power that simultaneously satisfies conditional expressions (1) to (5) given below, and
 satisfying conditional expressions (6) and (7) given below:

$$|hfb/hfa| < 0.8 \tag{1}$$

$$|hrb/hra| < 0.8 \tag{2}$$

$$0 < (Xr(y) - Xf(y))/f \tag{3}$$

$$NdA < 1.65 \tag{4}$$

$$50 < vdA < 62 \tag{5}$$

$$Bf/f > 2 \tag{6}$$

$$0.5 < |Im\phi/dexp| < 1 \tag{7}$$

where:
 hfa is the maximum height of axial ray on the magnification side surface of the aspherical lens;
 hfb is the height of principal ray on the magnification side surface of the aspherical lens at the maximum angle of view;
 hra is the maximum height of axial ray on the reduction side surface of the aspherical lens;
 hrb is the height of principal ray on the reduction side surface of the aspherical lens at the maximum angle of view;
 Xf(y) is the difference in an optical axis direction between the magnification side surface of the aspherical lens and its paraxial spherical surface at a height y;
 Xr(y) is the difference in an optical axis direction between the reduction side surface of the aspherical lens and its paraxial spherical surface at a height y;
 NdA is the refractive index of the aspherical lens at the d-line;
 vdA is the d-line based Abbe number;
 Bf is the back focus of the entire system when the reduction side is taken as the back side;
 f is the focal length of the entire system;
 Im$\phi$ is the maximum effective image circle diameter on the reduction side; and
 dexp is the distance from the reduction side conjugate position to the reduction side pupil position, in which
 y is the height from the optical axis and is any arbitrary value within a range of $0.5 \leq y \leq 1$ when the smaller one of the hfa and hra is taken as 1; and
 the sign of Xf(y) and Xr(y) is positive if each surface of the aspherical lens is on the reduction side of its paraxial spherical surface and negative if it is on the magnification side.

In the projection lens of the present invention, it is preferably that, when the spacing between adjacent lenses is taken as di and the focal length of the entire system is taken as f, an aspherical lens on the reduction side of the most reduction side spacing that satisfies di/f>0.8 is only the aspherical lens that satisfies the conditional expressions (1) to (5).

Preferably, the projection lens of the present invention satisfies a conditional expression (8) given below:

$$1 < fA/f < 5 \tag{8}$$

where fA is the focal length of the aspherical lens.

Preferably, the projection lens of the present invention satisfies a conditional expression (9) given below:

$$\alpha A < 10 \times 10^{-6} \qquad (9)$$

where αA is the linear expansion coefficient (unit K$^{-1}$) of the aspherical lens at 20° C.

Preferably, the projection lens of the present invention satisfies a conditional expression (10) given below:

$$Bf \times Im\phi \times \tan(\omega)/(f \times L) > 1.0 \qquad (10)$$

where

ω is the half angle of view; and

L is the length from the most magnification side lens surface to the most reduction side lens surface on the optical axis.

Preferably, the projection lens of the present invention includes an aspherical plastic lens disposed on the most magnification side and satisfies a conditional expression (11) given below:

$$|f/fpa| < 0.1 \qquad (11)$$

where fpa is the focal length of the aspherical plastic lens disposed on the most magnification side.

Preferably, the projection lens of the present invention satisfies a conditional expression (11) given below when the spacing between adjacent lenses is taken as di, the focal length of the entire system is taken as f, and the lens group substantially consisting of all lenses located on the reduction side of the most reduction side spacing that satisfies di/f>0.8 is taken as a rear group:

$$4 \le fGR/f < 6 \qquad (12)$$

where fGR is the focal length of the rear group.

It is more preferable that the projection lens of the present invention satisfies conditionals expressions (1'), (2'), (4'), (5'), (8'), and (10') given below instead of the conditional expressions (1), (2), (4), (5), (8), and (10) respectively:

$$|hfb/hfa| < 0.5 \qquad (1')$$

$$|hrb/hra| < 0.5 \qquad (2')$$

$$NdA < 1.60 \qquad (4')$$

$$55 < vdA < 62 \qquad (5')$$

$$2 \le fA/f < 3.5 \qquad (8')$$

$$Bf \times Im\phi \times \tan(\omega)/(f \times L) > 1.2 \qquad (10')$$

In the projection lens of the present invention, it is preferable that, when the spacing between adjacent lenses is taken as di, the focal length of the entire system is taken as f, and the lens group substantially consisting of all lenses located on the magnification side of the most reduction side spacing that satisfies di/f>0.8 is taken as a front group, the front group includes an aspherical plastic lens, a negative meniscus lens with a convex surface on the magnification side, and a negative lens disposed in order from the magnification side. More specifically, it is more preferable that the front group includes an aspherical plastic lens, a negative meniscus lens with a convex surface on the magnification side, a negative lens, a negative lens, and a positive lens.

A projection display apparatus according to the present invention includes a light source, a light valve that receives light from the light source, and the projection lens described above as a projection lens for projecting an optical image of light optically modulated by the light valve.

The term "magnification side" as used herein refers to the projected side (screen side) and the screen side is referred to as the magnification side even when reduced size projection is performed for convenience. In the mean time, the term "reduction side" as used herein refers to the original image display area side (light valve side) and the light valve side is referred to as the reduction side even when reduced size projection is performed for convenience.

The term "lens group" as used herein is not necessarily formed of a plurality of lenses and includes a lens group formed of only one lens.

The term "substantially" in the "substantially consisting of ----" intends to mean that the projection lens may include a lens substantially without any refractive power and an optical element other than a lens, such as an aperture stop, a cover glass, and the like, other than the defined lenses.

The surface shapes and the signs of the refractive powers of the aforementioned lenses are judged in the paraxial region for those having an aspherical surface.

The projection lens according to the present invention is configured to satisfy predetermined conditional expressions with respect to the back focus and the pupil position, and includes an aspherical lens having a positive refractive power and satisfies predetermined conditional expressions. This allows realization of a projection lens increased in angle of view, well corrected in aberrations, and capable of providing favorable projection performance, while maintaining a compact configuration with reduced cost.

Further, the projection display apparatus according to the present invention includes the projection lens of the present invention so that it can be formed small and may provide a wide-angle and satisfactory projection image.

BRIEF DESCRIPTION OF THE DRAWINGS

FIG. 15 is a schematic configuration diagram of a projection display apparatus according to an embodiment of the present invention.

DESCRIPTION OF THE PREFERRED EMBODIMENTS

Figure 1:
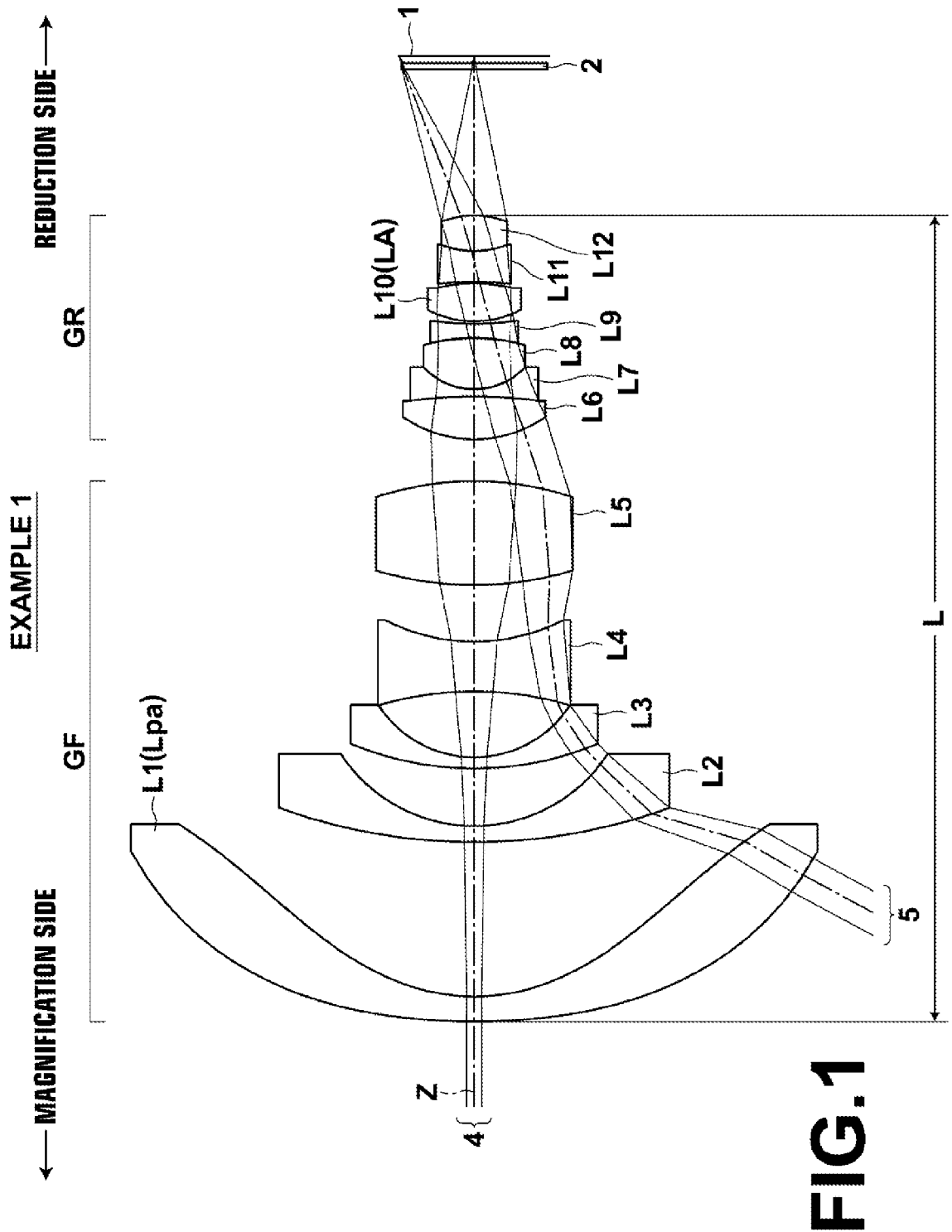
FIG. 1 is a cross-sectional view of a projection lens according to Example 1 of the present invention, illustrating the configuration thereof and ray trajectories.

Hereinafter, embodiments of the present invention will be described with reference to the accompanying drawings. FIGS. 1 to 6 illustrate cross-sectional views of configuration examples of projection lenses according to embodiments of the present invention. The configuration examples illustrated in FIGS. 1 to 6 correspond respectively to projection lenses of Example 1 to 6, to be described later. These projection lenses project image information displayed on the reduction side conjugate position onto the magnification side conjugate position. A schematic configuration diagram of a projection display apparatus according to an embodiment of the present invention is shown in FIG. 15.

The projection display apparatus according to an embodiment of the present invention will be described first with reference to FIG. 15. The projection display apparatus 100 shown in FIG. 15 includes a light source 101, an illumination optical system 102, a DMD 103 as a light valve, and a projection lens 104 according to an embodiment of the present invention.

The DMD includes a large number of tilting micro-mirrors disposed therein and, in the projection display apparatus, the reflection direction of light inputted therein through the illumination optical system is changed by changing the angle of each micro-mirror to achieve ON/OFF switching of each pixel, whereby an entire projection image is formed.

The light flux outputted from the light source 101 is selected and converted to each light of three primary colors (R, G, B) in a time series manner based on the color wheel, then the intensity distribution of the light is uniformed across a cross-section perpendicular to the optical axis Zi of the light flux by the illumination optical system 102, and inputted to the DMD 103. Based on the change in color of the inputted light, the modulation switching is performed for the colored light in the DMD 103. The light optically modulated by the DMD 103 is inputted to the projection lens 104. The optical image formed by the optically modulated light is projected onto the screen 105 by the projection lens 104. In this example, the position of the DMD 103 corresponds to the reduction side conjugate position and the position of the screen 105 corresponds to the magnification side conjugate position.

Next, the configurations of projection lenses according to the embodiments of the present invention will be described in detail. As the basic configurations of the examples illustrated in FIGS. 1 to 6 are identical and the illustration methods of FIGS. 1 to 6 are also identical, the description will be made hereinafter, by way of example, the configuration example shown in FIG. 1. In FIG. 1, the left side corresponds to the magnification side and the right side corresponds to the reduction side, and FIG. 1 also illustrates a plane parallel member 2 which assumes a filter, a cover glass, or the like, and an image display surface 1 of the light valve, on the assumption that the projection lens is installed in a projection display apparatus. FIG. 1 also illustrates the axial ray bundle 4 and a ray bundle 5 at the maximum angle of view when the projection distance is 150. The axial ray bundles 4 and the ray bundles 5 at the maximum angles of view shown in FIGS. 2 to 6 are those when the projection distances are those shown in the data of Examples, to be described later.

FIG. 1 illustrates only one image display surface 1, but the projection display apparatus may be configured so as to be able to display a full color image by separating the luminous flux from the light source into three primary colors by a color separation optical system and disposing three light valves for the respective colors.

The projection lens consists of a front group GF and a rear group GR in which, when the spacing between adjacent lenses is taken as di and the focal length of the entire system is taken as f, the front group GF is composed of all lenses on the magnification side while the rear group GR is composed of all lenses on the reduction side with the most reduction side spacing that satisfies $di/f>0.8$ as the border.

For example, in the example shown in FIG. 1, the entire system consists of 12 lenses of lenses L1 to L12 disposed in order from the magnification side, in which the front group GF is composed of lenses L1 to L5 while the rear group GR is composed of lenses L6 to L12. Note that, however, the number of lenses constituting the entire system of the projection lens of the present invention and the numbers of lenses of the front group GF and the rear group GR are not necessarily limited to those of the example shown in FIG. 1.

The front group GF preferably includes an aspherical plastic lens, a negative meniscus lens having a convex surface on the magnification side, and a negative lens disposed in order from the magnification side. This arrangement is advantageous for wide angle configuration while securing an appropriate length of back focus.

In a projection display apparatus that uses a reflective light valve, consideration should be given to each member not to interfere with each other and not to hinder the optical path, because the optical path has a bent shape, as illustrated, by way of example, in FIG. 15. In the example shown in FIG. 15, for example, consideration should be given such that the illumination optical system 102 and the projection lens 104 do not interfere with each other and the illumination light from the illumination optical system 102 to the DMD 103 is not blocked by the projection lens 104. Further, consideration should be given such that the unnecessary reflection light from a pixel of the DMD 103 being switched to OFF is not inputted inside of the projection lens 104. This requires an appropriate length of back focus to be secured.

More specifically, it is preferable that the front group GF includes an aspherical plastic lens, a negative meniscus lens with a convex surface on the magnification side, a negative lens, a negative lens, and a positive lens disposed in order from the magnification side. This arrangement is advantageous for wide angle configuration while securing an appropriate length of back focus. Further, it is advantageous for correcting field curvature satisfactorily.

The projection lens includes an aspherical lens LA that has a positive refractive power in the paraxial region and simultaneously satisfies conditional expressions (1) to (5) given below. In order to distinguish from the other aspherical lenses, the aspherical lens that simultaneously satisfies the conditional expressions (1) to (5) is referred to as the aspherical lens LA in the following description of the embodiments. Further, the projection lens satisfies conditional expressions (6) and (7).

$$|hfb/hfa| < 0.8 \quad (1)$$

$$|hrb/hra| < 0.8 \quad (2)$$

$$0 < (Xr(y) - Xf(y))/f \quad (3)$$

$$NdA < 1.65 \quad (4)$$

$$50 < vdA < 62 \quad (5)$$

$$Bf/f > 2 \quad (6)$$

$$0.5 < |Im\phi/dexp| < 1 \quad (7)$$

where:

hfa is the maximum height of axial ray on the magnification side surface of the aspherical lens LA;

hfb is the height of principal ray at the maximum angle of view on the magnification side surface of the aspherical lens LA;

hra is the maximum height of axial ray on the reduction side surface of the aspherical lens LA;

hrb is the height of principal ray at the maximum angle of view on the reduction side surface of the aspherical lens LA;

Xf(y) is the difference in optical axis direction between the magnification side surface of the aspherical lens LA and its paraxial spherical surface at a height y;

Xr(y) is the difference in optical axis direction between the reduction side surface of the aspherical lens LA the and its paraxial spherical surface at a height y;

NdA is the refractive index of the aspherical lens LA at the d-line;

vdA is the Abbe number of the aspherical lens LA with reference to the d-line;

Bf is the back focus of the entire system when the reduction side is taken as the back side;

f is the focal length of the entire system;

Im$\phi$ is the maximum effective image circle diameter on the reduction side; and dexp is the distance from the reduction side conjugate position to the reduction side pupil position, in which:

y is the height from the optical axis and is any arbitrary value within a range of when the smaller one of the hfa and hra is taken as 1; and the sign of Xf(y) and Xr(y) is positive if each surface of the aspherical lens LA is on the reduction side of its paraxial spherical surface and negative if it is on the magnification side.

Figure 7:
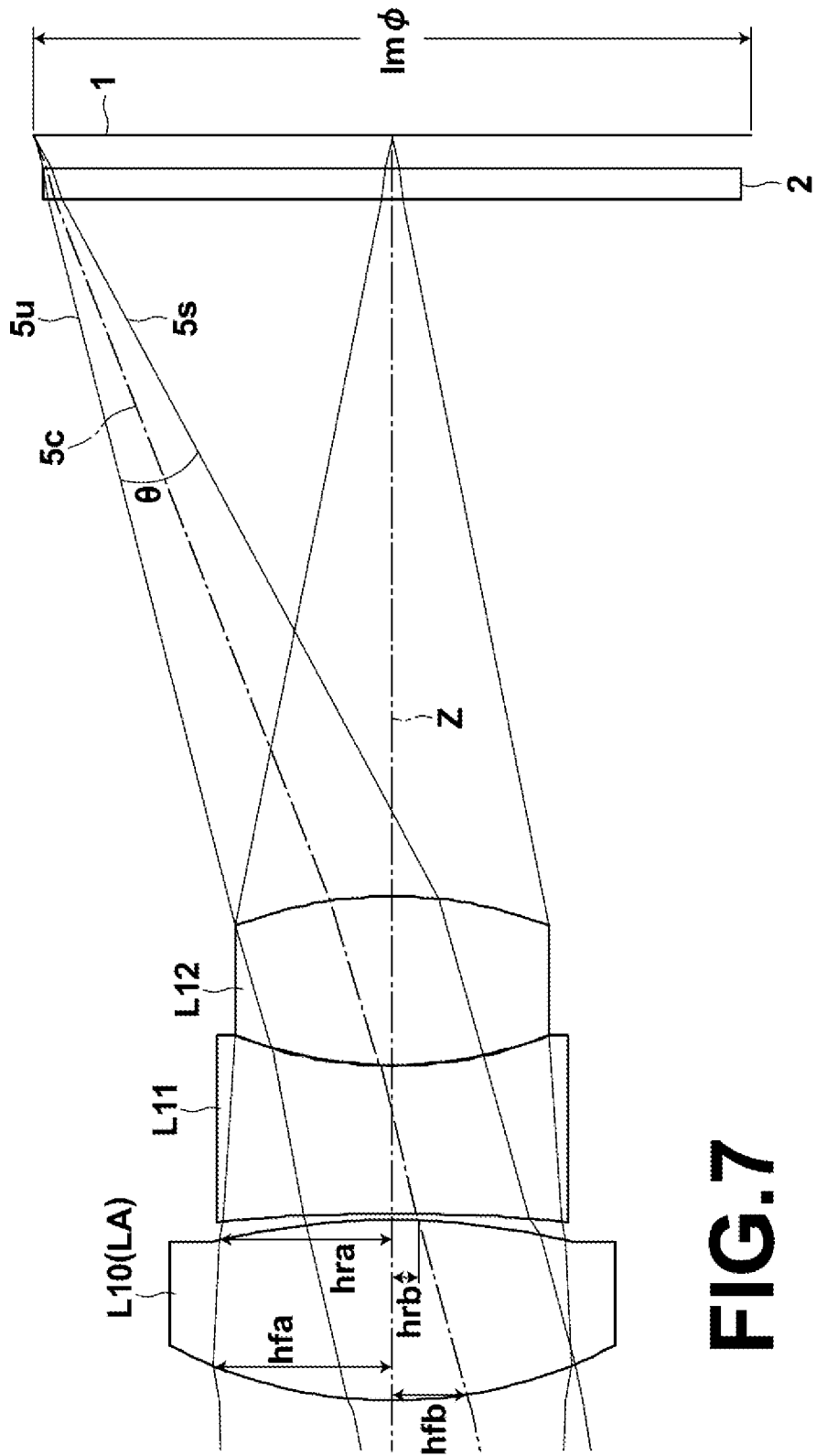
FIG. 7 is a partially enlarged view of the projection lens shown in FIG. 1.

In the example shown in FIG. 1, the lens L10 corresponds to the aspherical lens LA. FIG. 7 is a partially enlarged view from the lens L10 (aspherical lens LA) to the image display surface 1 shown in FIG. 1, illustrating, by way of example, the hfa, hfb, hra, and hrb. Note that the lens L9 is omitted in FIG. 7.

The height of the ray with respect to the conditional expressions described above as used herein refers to the distance from the optical axis Z regardless of whether it is on the upper side or on the lower side of the optical axis. Further, the ray corresponding to the angle bisector of the angle θ formed between the maximum upper side ray 5u at the maximum angle of view and the maximum lower side ray 5s at the maximum angle of view incident on the image display surface 1 is referred to as the maximum angle principal ray 5c. The line of the maximum angle principal ray Sc intersecting the image display surface 1 is extended and the position where the line intersects the optical axis Z is referred to as the reduction side pupil position exp.

The term "Satisfying the conditional expression (3)" as used herein refers to that the aspherical lens LA satisfies the conditional expression (3) with respect to all values of y within the range of 0.5≤y≤1. For example, in the example shown in FIG. 1, hfa>hra and the aspherical lens LA satisfies the conditional expression (3) with respect to all heights within the range from 0.5×hra to not greater than hra.

Figure 8:
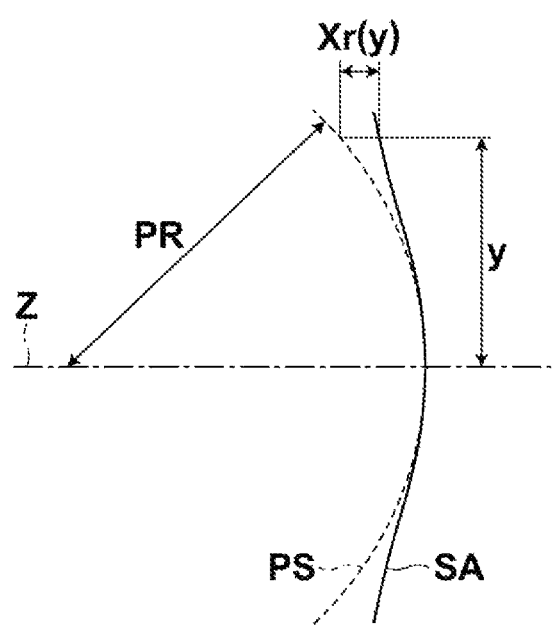
FIG. 8 is a drawing for explaining Xr(y).

FIG. 8 is a conceptual drawing for explaining the Xr(y). The Xr(y) is the difference in optical axis direction between the reduction side surface SA of the aspherical lens LA and its paraxial spherical surface PS at a height y. Here, the paraxial spherical surface PS of the reduction side surface SA is a spherical surface passing through the intersection between the surface SA and the optical axis Z with the paraxial radius of curvature PR of the surface SA as the radius thereof. The same applies to the Xf (y) with respect to the magnification side surface.

The conditional expressions (1) and (2) are expressions for disposing the aspherical lens LA at an appropriate position within the projection lens. In the compact and wide angle projection lens which is an object of the present invention, the position of the lens that satisfies the conditional expressions (1) and (2) is limited to a certain range. For example, in the examples shown in FIGS. 1 to 6, the aspherical lens LA is disposed in the rear group GR and at the third or fourth position from the reduction side. Disposition of the aspherical lens LA at a position that does not exceed the upper limits of the conditional expressions (1) and (2) makes it easy to satisfactorily correct spherical aberration and astigmatism.

In order to further enhance the advantageous effect described above, it is preferable that the aspherical lens LA satisfies at least either one of conditions (1°) and (2°) given below:

$$|hfb/hfa| < 0.5 \quad (1°)$$

$$|hrb/hra| < 0.5 \quad (2')$$

In view of the circumstances that the assembly tolerance becomes small if a plurality of aspherical lenses are disposed at close positions, leading to cost increase, and that the projection lens can be manufactured at lower cost as the number of aspherical lenses decreases, it is preferable that an aspherical lens LA that simultaneously satisfies the conditional expressions (1) to (5) is present only one in the rear group GR and the aspherical lens LA is the sole aspherical lens included in the rear group GR.

The conditional expression (3) relates to the aspherical shape of the aspherical lens LA. Arrangement of the aspherical lens LA so as not to fall below the lower limit of the conditional expression (3) makes it easy to effectively correct astigmatism and field curvature. Further, as the correction of astigmatism and field curvature becomes easy, the increase in angle of view becomes possible with a small number of lenses in comparison with the case where the conditional expression (3) is not satisfied and, for example, both the angle increase to not less than 110° in total angle of view and compact configuration can be realized.

The conditional expression (4) relates to a preferable range of the refractive index of the aspherical lens LA. Selection of a material having a positive refractive power so as not to exceed the upper limit of the conditional expression (4) for the aspherical lens LA makes it easy to reduce the Petzval sum close to 0, which tends to become a large absolute negative value when the angle of view is increased. Further, selection of a material so as not to exceed the upper limit of the conditional expression (4) for the aspherical lens LA also allows the prevention of cost increase.

In order to further enhance the advantageous effect described above, it is preferable that the aspherical lens LA satisfies a conditional expression (4°) given below:

$$NdA < 1.60 \quad (4')$$

The conditional expression (5) relates to a preferable range of the Abbe number of the aspherical lens LA. Selection of a material having a positive refractive power such that the Abbe number falls within the range of the conditional expression (5) for the aspherical lens LA makes it easy to take a balance in the correction of chromatic aberrations, which is advantageous for the correction of longitudinal chromatic aberration in wide angle optical systems and, in particular, in ultra wide angle optical systems.

In order to further enhance the advantageous effect described above, it is preferable that the aspherical lens LA satisfies a conditional expression (5') given below:

$$55 < \nu dA < 62 \tag{5'}$$

The conditional expressions (6) and (7) relates to the entire system of projection lens. Configuration of the projection lens so as not to fall below the lower limit of the conditional expression (6) allows an appropriate back focus to be ensured. As described in the preferable configuration of the front group GF, troubles, such as the interference between the illumination optical system 102 and the projection lens, the blockage of illumination light outputted from the illumination optical system 102 by the projection lens, and the entrance of unnecessary reflection light from a pixel of the DMD being switched to OFF into the projection lens 104, may be avoided by securing an appropriate back focus.

Further, by satisfying the conditional expression (7), the reduction side may become a non-telecentric optical system. The projection lens used with a DMD, which is a reflective light valve, is not necessarily formed telecentric. As described above, an appropriate back focus is required in a projection display apparatus in order to avoid interference between the members and disturbance of the optical path. It is also required that the lens diameter on the reduction side is reduced. In the event that the reduction side of a projection lens is made telecentric, if back focus is tried to be extended, the lens diameter on the reduction side becomes large. Arrangement of the reduction side as a non-telecentric optical system makes it easy to ensure a long back focus while reducing the lens diameter on the reduction side.

Arrangement of the projection lens so as not to fall below the lower limit of the conditional expression (7) allows reduction of lens diameter on the reduction side and the prevention of troubles, such as the interference between the illumination optical system 102 and the projection lens, the blockage of illumination light outputted from the illumination optical system 102 by the projection lens, and the entrance of unnecessary reflection light from a pixel of the DMD being switched to OFF into the projection lens 104. Arrangement of the projection lens so as not to exceed the upper limit of the conditional expression (7) prevents the lens diameter on the magnification side from increasing.

Further, the projection lens preferably satisfies a conditional expression (8) given below:

$$1 < fA/f < 5 \tag{8}$$

where fA is the focal length of the aspherical lens LA and f is the focal length of the entire system.

Restriction of the refractive power of the aspherical lens LA so as not to fall below the lower limit of the conditional expression (8) makes it easy to satisfactorily correct astigmatism. Securing of the refractive power of the aspherical lens LA so as not to exceed the upper limit of the conditional expression (8), it becomes easy to correct spherical aberration satisfactorily.

In order to further enhance the advantageous effect described above, it is more preferable that the projection lens satisfies a conditional expression (8') given below:

$$2 < fA/f < 3.5 \tag{8'}$$

Further, the projection lens preferably satisfies a conditional expression (9) given below:

$$\alpha A < 10 \times 10^{-6} \tag{9}$$

where $\alpha A$ is the linear expansion coefficient (unit $K^{-1}$) of the aspherical lens LA at 20° C.

The aspherial lens LA is disposed at a position that satisfies the conditional expressions (1) and (2), and such a position has a high density of rays and when installed in a projection display apparatus and used, the temperature thereof is likely to increase. The point of focus and the performance are changed due to the temperature change, but the selection of a material that does not cause the aspherical lens LA to exceed the upper limit of the conditional expression (9) can minimize the influence of the temperature change.

Further, the projection lens preferably satisfies a conditional expression (10) given below:

$$Bf \times Im\phi \times \tan(\omega)/(f \times L) > 1.0 \tag{10}$$

where:
Bf the back focus of the entire system when the reduction side is taken as the back side;
Im$\phi$ is the maximum effective image circle diameter on the reduction side;
$\omega$ is the half angle of view;
f is the focal length of the entire system; and
L is the length from the most magnification side lens surface to the most reduction side lens surface on the optical axis.

Arrangement of the projection lens so as not to fall below the lower limit of the conditional expression (10) makes it easy to realize a wide angle optical system that ensures a proper back focus while being compact.

In order to further enhance the advantageous effect described above, it is more preferable that the projection lens satisfies a conditional expression (10') given below:

$$Bf \times Im\phi \times \tan(\omega)/(f \times L) > 1.2 \tag{10'}$$

Further, the projection lens preferably includes an aspherical plastic lens disposed on the most magnification side and satisfies a conditional expression (11) given below:

$$|f/fpa| < 0.1 \tag{11}$$

where f is the focal length of the entire system and fpa is the focal length of the aspherical plastic lens disposed on the most magnification side.

In the example shown in FIG. 1, the lens L1 corresponds to the aspherical plastic lens Lpa disposed on the most magnification side. Disposition of the aspherical plastic lens on the most magnification side is advantageous for correcting various aberrations including distortion which is likely to become problematic when trying to increase the angle of view. As the most magnification side lens in a wide angle projection optical system has a large diameter, it is preferable that plastic is used as the material for cost and weight reduction but a lens made of plastic is likely to have a large change in point of focus when the temperature is changed in comparison with a glass lens. Consequently, restriction of the refractive power of the aspherical plastic lens Lpa so as not to exceed the upper limit of the conditional expression (11) allows the change in the focal length at the time of temperature change to be minimized.

Further, the projection lens preferably satisfies a conditional expression (12) given below:

$$4 < fGR/f < 6 \tag{12}$$

where fGR is the focal length of the rear group and f is the focal length of the entire system.

Restriction of the refractive power of the rear group GR so as not to fall below the lower limit of the conditional expression (12) makes it easy to correct spherical aberration and field curvature. Securing of the refractive power of the rear group GR so as not to exceed the upper limit of the conditional expression (12) allows the increase in the lens diameter on the magnification side to be minimized.

The projection lens of the present invention preferably has an F-number smaller than 3.0 with the distortion in the range from −2% to +2%. If the projection lens is a zooming optical system, it is preferable that the F-number is less than 3.0 and the distortion is in the range from −2% to +2% over the entire zooming range.

In order to secure proper relative illumination, it is preferable that, in the projection lens of the present invention, the angle formed between the maximum upper side ray 5$u$ at the maximum angle of view and the maximum lower side ray 5$s$ at the maximum angle of view is not less than 10°.

The projection lens of the present invention may be configured to perform refocusing by moving some lenses of the entire system.

The preferable configurations described above may be combined arbitrarily and are preferable to be employed, as appropriate, according to the requirements of the projection lens.

Specific configurations, including the numbers and shapes of the lenses, of the examples shown in FIGS. 1 to 6 will now be described. All examples shown in FIGS. 1 to 6 consist of a front group GF and a rear group GR disposed in order from the magnification side in which the aspherical plastic lens Lpa disposed on the most magnification side is the sole aspherical lens included in the front group GF and the aspherical lens LA is the sole aspherical lens included in the rear group GR.

The front group GF of the example shown in FIG. 1 is composed of a lens L1 having a negative meniscus shape with a convex surface on the magnification side in the paraxial region, a lens L2 having a negative meniscus shape with a convex surface on the magnification side, a lens L3 having a negative meniscus shape with a convex surface on the magnification side, a lens L4 having a biconcave shape, and a lens L5 having a biconvex shape, disposed in order from the magnification side. The rear group GR is composed of a cemented lens in which a lens L6 having a biconvex shape and a lens L7 having a biconcave shape are cemented, a lens L8 having a biconvex shape, a lens L9 having a biconcave shape, a lens L10 having a biconvex shape in the paraxial region, a lens L11 having a biconcave shape, and a lens L12 having a biconvex shape, disposed in order from the magnification side. The aspherical lens LA corresponds to the lens L10.

Figure 2:
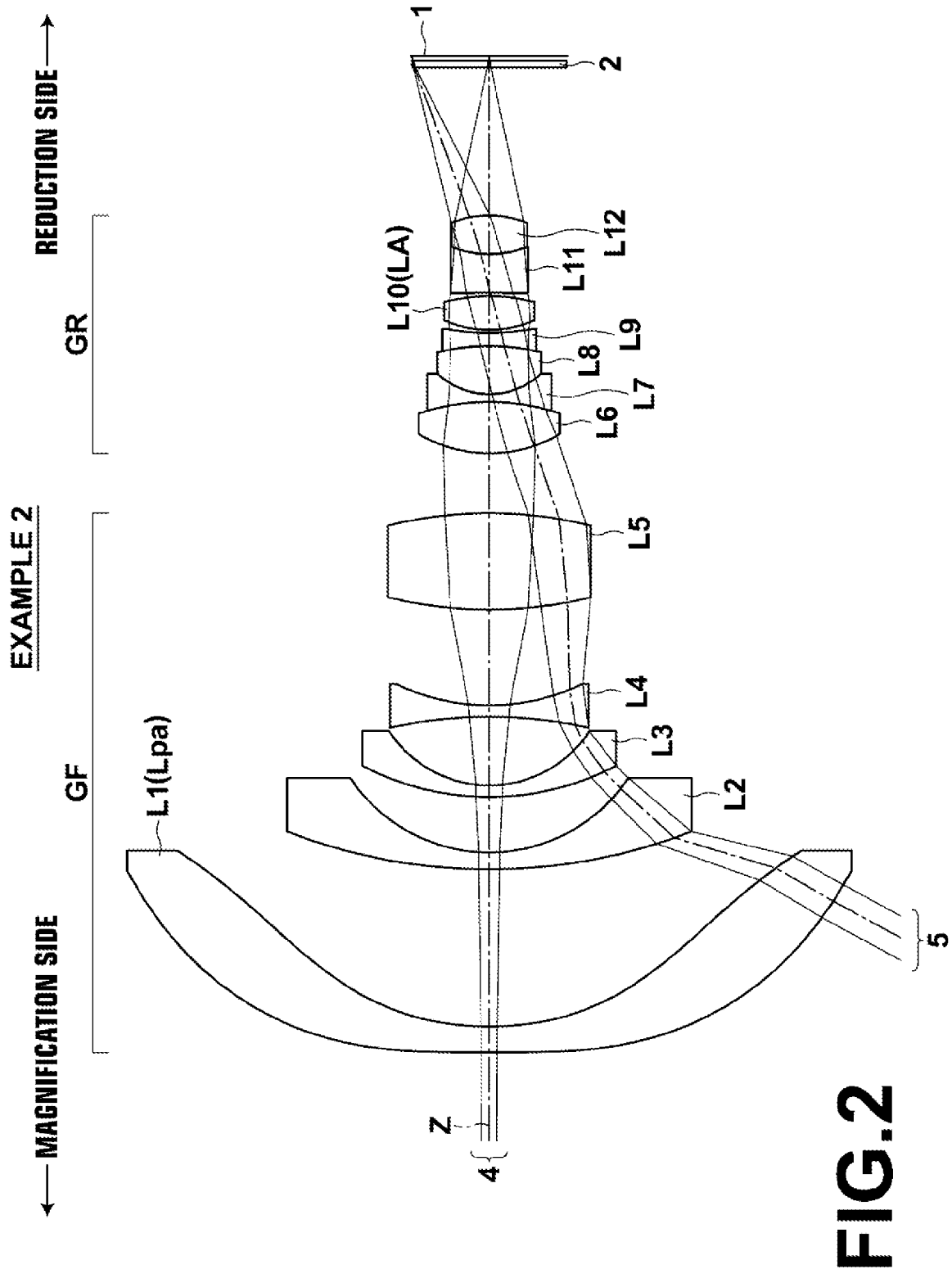
FIG. 2 is a cross-sectional view of a projection lens according to Example 2 of the present invention, illustrating the configuration thereof and ray trajectories.

The example shown in FIG. 2 is identical to the example shown in FIG. 1 except that the lens L1 has a biconcave shape in the paraxial region. The aspherical lens LA corresponds to the lens L10.

Figure 3:
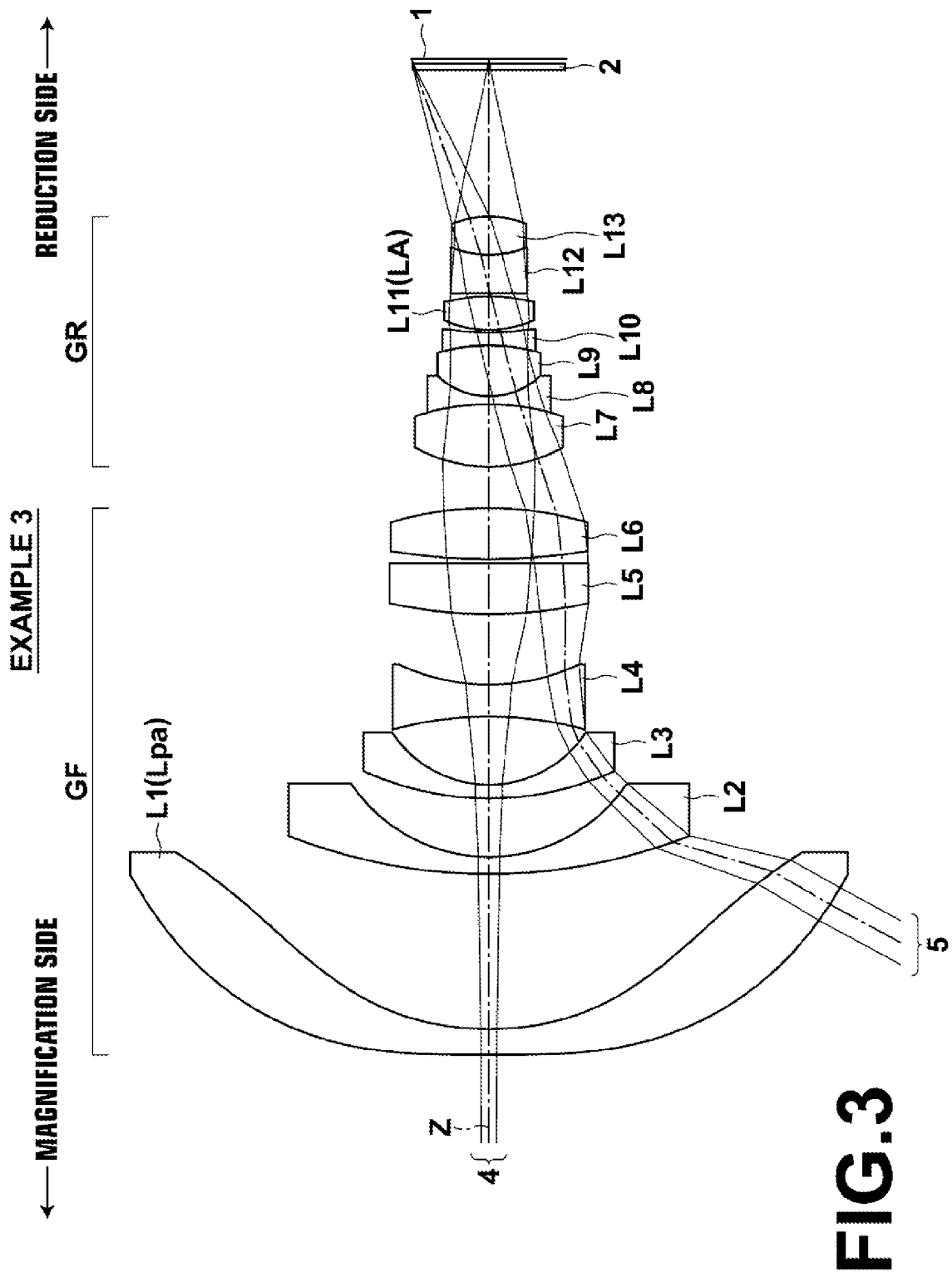
FIG. 3 is a cross-sectional view of a projection lens according to Example 3 of the present invention, illustrating the configuration thereof and ray trajectories.

The front group GF of the example shown in FIG. 3 is composed of a lens L1 having a biconcave shape in the paraxial region, a lens L2 having a negative meniscus shape with a convex shape on the magnification side, a lens L3 having a negative meniscus shape with a convex surface on the magnification side, a lens L4 having a biconcave shape, a lens L5 having a planoconvex shape with a planar surface on the reduction side, and lens L6 having a biconvex shape, disposed in order from the magnification side. The rear group GR is composed of a cemented lens in which a lens L7 having a biconvex shape and a lens L8 having a biconcave shape are cemented, a lens L9 having a biconvex shape, a lens L10 having a biconcave shape, a lens L11 having a biconvex shape in the paraxial region, a lens L12 having a biconcave shape, and a lens L13 having a biconvex shape, disposed in order from the magnification side. The aspherical lens LA corresponds to the lens L11.

Figure 4:
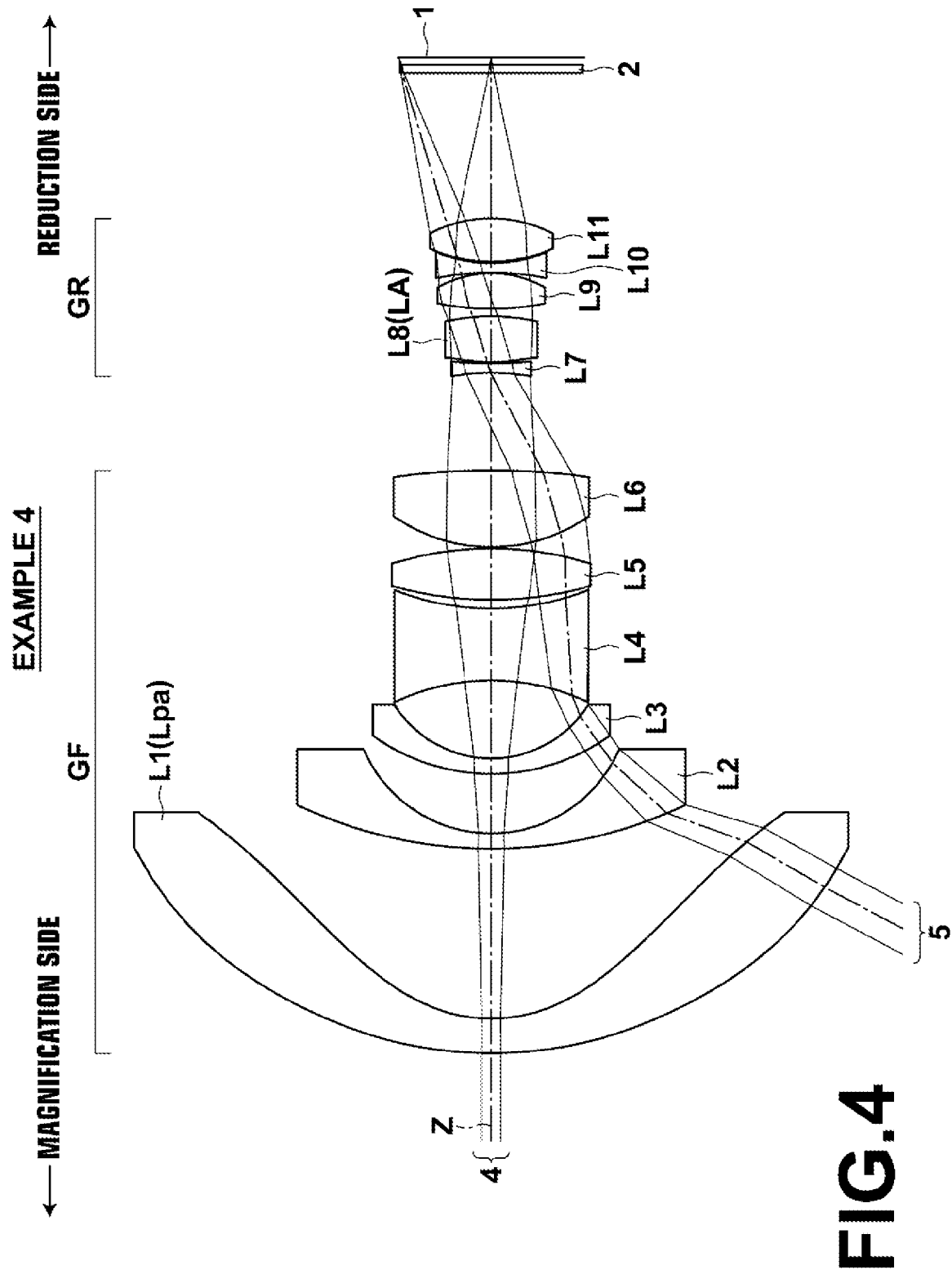
FIG. 4 is a cross-sectional view of a projection lens according to Example 4 of the present invention, illustrating the configuration thereof and ray trajectories.

The front group GF of the example shown in FIG. 4 is composed of a lens L1 having a negative meniscus shape with a convex surface on the magnification side in the paraxial region, a lens L2 having a negative meniscus shape with a convex surface on the magnification side, a lens L3 having a negative meniscus shape with a convex surface on the magnification side, a lens L4 having a biconcave shape, a lens L5 having a biconvex shape, and a lens L6 having a biconvex shape, disposed in order from the magnification side. The rear group GR is composed of a lens L7 having a biconcave shape, a lens L8 having a biconvex shape, a lens L9 having a biconvex shape, a lens L10 having a biconcave shape, and a lens L11 having a biconvex shape, disposed in order from the magnification side. The aspherical lens LA corresponds to the lens L8.

Figure 5:
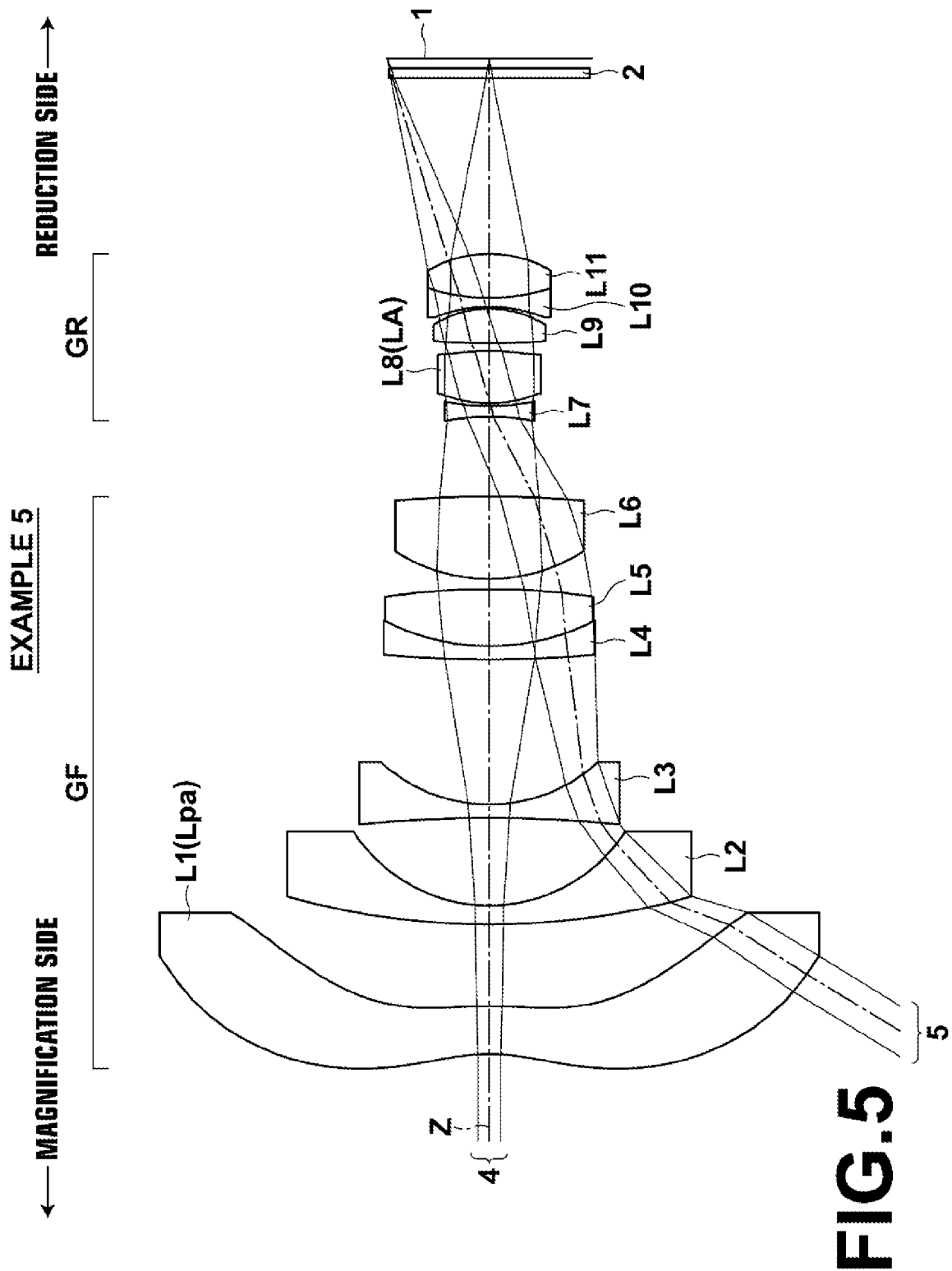
FIG. 5 is a cross-sectional view of a projection lens according to Example 5 of the present invention, illustrating the configuration thereof and ray trajectories.

The front group GF of the example shown in FIG. 5 is composed of a lens L1 having a negative meniscus shape with a concave surface on the magnification side in the paraxial region, a lens L2 having a negative meniscus shape with a convex surface on the magnification side, a lens L3 having a biconcave shape, a cemented lens in which a lens L4 having a negative meniscus shape with a convex surface on the magnification side and a lens L5 having a biconvex shape are cemented, and a lens L6 having a biconvex shape, disposed in order from the magnification side. The rear group GR is composed of a lens L7 having a biconcave shape, a lens L8 having a biconvex shape, a lens L9 having a biconvex shape, and a cemented lens in which a lens L10 having a biconcave shape and a lens L11 having a biconvex shape are cemented, disposed in order from the magnification side. The aspherical lens LA corresponds to the lens L8.

Figure 6:
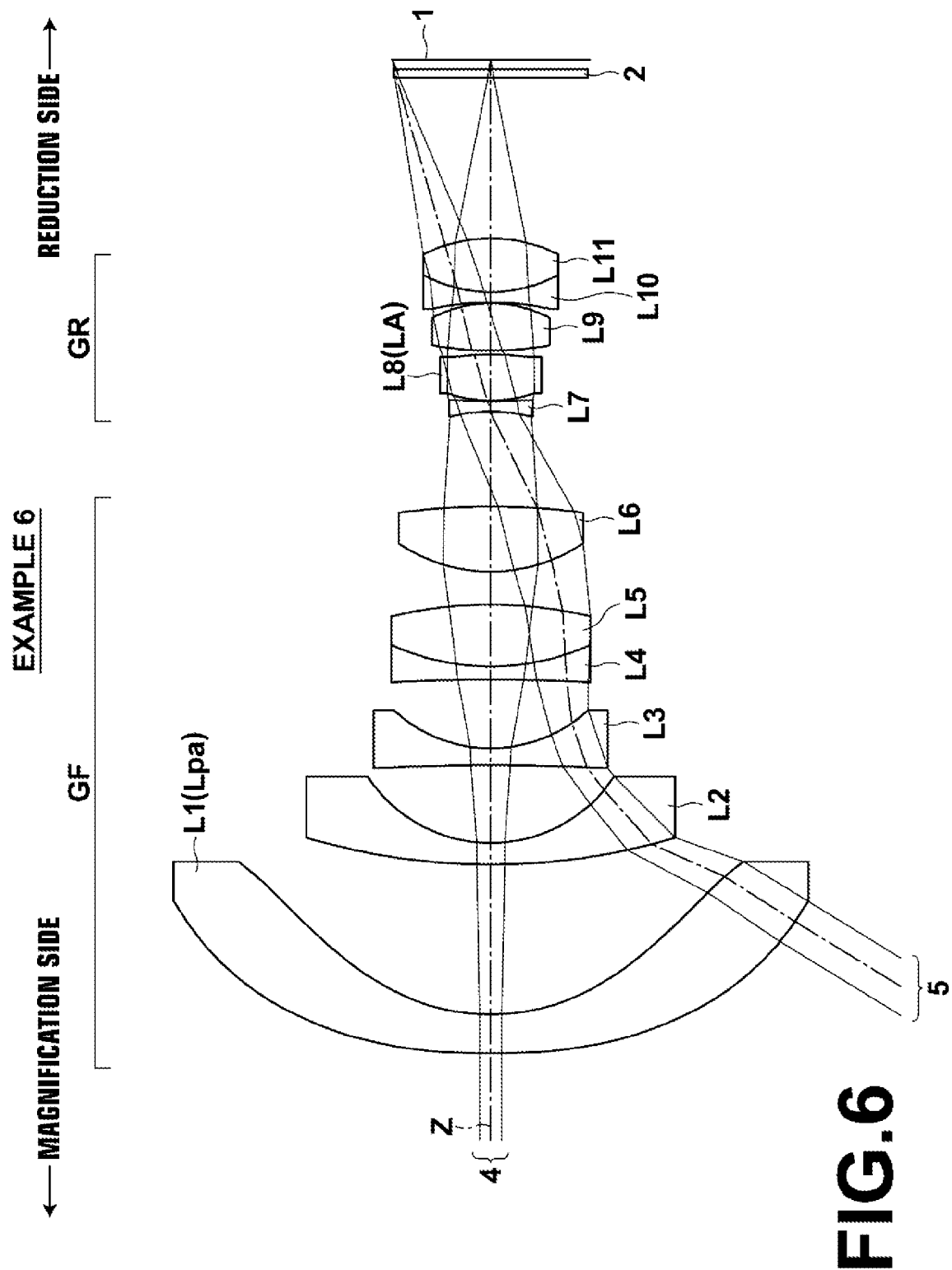
FIG. 6 is a cross-sectional view of a projection lens according to Example 6 of the present invention, illustrating the configuration thereof and ray trajectories.

The example shown in FIG. 6 is identical to the example shown in FIG. 5 except that the lens L1 has a negative meniscus shape with a convex surface on the magnification side in the paraxial region and the lens L4 has a biconcave shape. The aspherical lens LA corresponds to the lens L8.

Next, the examples shown in FIGS. 1 to 6 are taken as Examples 1 to 6 respectively and numerical data of the Examples will be described. As the numerical data of the projection lens of Example 1, basic lens data and aspherical surface coefficients are shown in Tables 1 and 2 respectively. Likewise, basic lens data and aspherical surface coefficients of Examples 2 to 6 are shown in Tables 3 to 12. In the following description of the data, the description will be made by taking those of Example 1 as example, but the same applies to Examples 2 to 6 unless otherwise specifically described. Further, values in the tables shown below are rounded to a predetermined digit.

The values shown in Tables 1 and 2 are those when the focal length of the entire system is normalized to the value of 1. The values shown in Table 1 are those at the time of the projection distance shown at the top outside the box. The specs, such as the focal length of the entire system, F-number, and the like, of each Example are listed collectively in Table 13, to be shown later.

The Si column of Table 1 indicates $i^{th}$ surface number in which a number i (i=1, 2, 3, - - - ) is given to each surface of each constituent element in a serially increasing manner toward the reduction side with the magnification side surface of the most magnification side constituent element being taken as the first surface. The Ri column indicates the radius of curvature of $i^{th}$ surface and the Di column indicates the surface spacing between $i^{th}$ surface and $(i+1)^{th}$ surface on the optical axis Z. The Ndj column indicates the refractive index of $j^{th}$ constituent element with respect to the d-line (587.6 nm) in which a number j (j=1, 2, 3, - - - ) is given to each constituent element in a serially increasing manner toward the reduction side with the most magnification side constituent element being taken as the first constituent element, and the νdj column indicates the Abbe number of $j^{th}$ constituent element with respect to the d-line.

Note that the sign of the radius of curvature is positive if the surface shape is convex on the magnification side and negative if it is convex on the reduction side. The basic lens data also includes the optical member 2. An asterisk mark "*" is attached to the surface number of an aspherical surface and a value of paraxial radius of curvature is shown in the section of the radius of curvature of the aspherical surface.

Table 2 shows aspherical surface coefficients of each aspherical surface of Example 1. The "E-n" (n: integer) in the values of aspherical surface coefficients in Table 2 represents "×10$^{-n}$". The aspherical surface coefficients represent values of coefficients KA, and Am in an aspherical surface expression given below. Here, m is an integer not less than 3 and the value taken differs depending on each aspherical surface. In the tables of aspherical surface coefficients of Example 2 and some other examples, the symbol "-" is indicated in the sections having no applicable aspherical surface coefficients.

$$Zd = C \cdot h^2 / \{1 + (1 - KA \cdot C^2 \cdot h^2)^{1/2}\} + \Sigma Am \cdot h^m$$

where
Zd: depth of aspheric surface (length of vertical line from a point on the aspheric surface at height h to a flat surface orthogonal to the optical axis to which the aspherical apex contacts);
h: height (distance from the optical axis to lens surface);
C: paraxial curvature; and
KA, Am: aspherical surface coefficients.

TABLE 1

Example 1 (Projection Distance: 150)

| Si | Ri | Di | Ndj | ν dj |
|---|---|---|---|---|
| *1 | 17.1731 | 0.6227 | 1.49100 | 57.58 |
| *2 | 4.8978 | 3.8806 | | |
| 3 | 14.3108 | 0.4048 | 1.72342 | 37.95 |
| 4 | 3.9971 | 1.4447 | | |
| 5 | 8.0063 | 0.2802 | 1.63854 | 55.38 |
| 6 | 2.8540 | 1.6556 | | |
| 7 | -8.4196 | 1.2501 | 1.58913 | 61.14 |
| 8 | 4.8705 | 1.4266 | | |
| 9 | 8.4040 | 2.6080 | 1.72047 | 34.71 |
| 10 | -7.7706 | 1.0543 | | |
| 11 | 3.1179 | 1.0731 | 1.63980 | 34.46 |
| 12 | -12.3477 | 0.1789 | 1.77250 | 49.60 |

TABLE 1-continued

Example 1 (Projection Distance: 150)

| Si | Ri | Di | Ndj | ν dj |
|---|---|---|---|---|
| 13 | 1.7314 | 0.0078 | | |
| 14 | 1.7441 | 1.2788 | 1.51742 | 52.43 |
| 15 | -4.7209 | 0.0155 | | |
| 16 | -4.3094 | 0.3468 | 1.90366 | 31.32 |
| 17 | 7.4547 | 0.0622 | | |
| *18 | 2.4718 | 0.9556 | 1.58313 | 59.46 |
| *19 | -3.3501 | 0.0310 | | |
| 20 | -9.7135 | 0.7783 | 1.80610 | 33.27 |
| 21 | 2.2326 | 0.0048 | | |
| 22 | 2.2767 | 0.8870 | 1.497008 | 1.54 |
| 23 | -2.2742 | 3.6737 | | |
| 24 | ∞ | 0.1634 | 1.51633 | 64.14 |
| 25 | ∞ | 0.1728 | | |

TABLE 2

Example 1

| Si | 1 | 2 | 18 | 19 |
|---|---|---|---|---|
| KA | -8.9446029E-01 | -2.9001533E+00 | 1.0000000E+00 | 1.0000000E+00 |
| A4 | 4.1823714E-04 | 2.6636082E-03 | -4.1751075E-03 | 2.5197865E-02 |
| A6 | -2.5867527E-06 | -7.8046770E-05 | -1.7353514E-03 | -3.1275757E-03 |
| A8 | 1.7342321E-08 | 8.9768668E-07 | 2.7783669E-03 | 4.2592200E-03 |
| A10 | 2.1175819E-10 | -3.8267479E-09 | 3.1378491E-04 | 9.6172439E-06 |

TABLE 3

Example 2 (Projection Distance: 120)

| Si | Ri | Di | Ndj | ν dj |
|---|---|---|---|---|
| *1 | -1325.9571 | 0.6214 | 1.49100 | 57.58 |
| *2 | 7.4311 | 3.7842 | | |
| 3 | 13.4516 | 0.4070 | 1.72342 | 37.95 |
| 4 | 4.0142 | 1.3346 | | |
| 5 | 6.5423 | 0.2796 | 1.74400 | 44.78 |
| 6 | 2.8754 | 1.6544 | | |
| 7 | -10.6098 | 0.2734 | 1.62041 | 60.29 |
| 8 | 5.1241 | 2.3038 | | |
| 9 | 9.9221 | 2.3286 | 1.80610 | 33.27 |
| 10 | -9.9221 | 1.4399 | | |
| 11 | 3.3276 | 1.2366 | 1.56732 | 42.82 |
| 12 | -5.3306 | 0.1864 | 1.77250 | 49.60 |
| 13 | 1.8166 | 0.0079 | | |
| 14 | 1.8351 | 1.1542 | 1.60342 | 38.03 |
| 15 | -4.9676 | 0.0079 | | |
| 16 | -4.7133 | 0.3107 | 1.90366 | 31.32 |
| 17 | 6.1924 | 0.0699 | | |
| *18 | 2.7242 | 0.8140 | 1.58313 | 59.46 |
| *19 | -3.5859 | 0.0761 | | |
| 20 | -35.1036 | 0.9321 | 1.80518 | 25.42 |
| 21 | 2.3999 | 0.0062 | | |
| 22 | 2.4748 | 0.9212 | 1.48749 | 70.23 |
| 23 | -2.4748 | 3.5730 | | |
| 24 | ∞ | 0.1631 | 1.51633 | 64.14 |
| 25 | ∞ | 0.1087 | | |

TABLE 4

| | Example 2 | | | |
|---|---|---|---|---|
| Si | 1 | 2 | 18 | 19 |
| KA | −1.0000009E+01 | −5.2638545E+00 | 1.0000000E+00 | 1.0000000E+00 |
| A3 | 1.9328352E−03 | 4.1344581E−03 | — | — |
| A4 | 2.0301900E−03 | 3.3603791E−04 | −4.8648545E−03 | 1.7823156E−02 |
| A5 | −3.0183600E−04 | 6.0967174E−04 | — | — |
| A6 | 2.2640893E−06 | −7.9063426E−05 | 9.2091990E−04 | 1.5482808E−03 |
| A7 | 3.2064571E−06 | −1.1250802E−05 | — | — |
| A8 | −2.4694374E−07 | 7.3021737E−07 | 1.1771058E−03 | −1.1633665E−03 |
| A9 | 4.1703046E−09 | 1.9855221E−07 | — | — |
| A10 | −2.2412966E−09 | −1.8166215E−08 | 1.5556732E−03 | 3.2876421E−03 |
| A11 | 5.2560606E−10 | 8.9661546E−10 | | |
| A12 | −2.8822010E−11 | −5.9177528E−11 | | |

TABLE 5

| | Example 3 (Projection Distance: 120) | | | |
|---|---|---|---|---|
| Si | Ri | Di | Ndj | ν dj |
| *1 | −1325.5540 | 0.6212 | 1.49100 | 57.58 |
| *2 | 7.4289 | 3.7707 | | |
| 3 | 13.1957 | 0.4162 | 1.72342 | 37.95 |
| 4 | 4.0341 | 1.4244 | | |
| 5 | 7.3256 | 0.3308 | 1.74400 | 44.78 |
| 6 | 2.8139 | 1.6570 | | |
| 7 | −8.8437 | 0.7765 | 1.62041 | 60.29 |
| 8 | 5.1102 | 1.7161 | | |
| 9 | 11.1191 | 1.2424 | 1.80610 | 33.27 |
| 10 | ∞ | 0.1009 | | |
| 11 | 14.5924 | 1.2424 | 1.59551 | 39.24 |
| 12 | −8.3081 | 1.0060 | | |
| 13 | 3.6808 | 1.5189 | 1.56732 | 42.82 |
| 14 | −5.6102 | 0.1864 | 1.77250 | 49.60 |

TABLE 5-continued

| | Example 3 (Projection Distance: 120) | | | |
|---|---|---|---|---|
| Si | Ri | Di | Ndj | ν dj |
| 15 | 1.8069 | 0.0084 | | |
| 16 | 1.8255 | 1.2284 | 1.61293 | 37.00 |
| 17 | −4.6624 | 0.0077 | | |
| 18 | −4.4490 | 0.3106 | 1.90366 | 31.32 |
| 19 | 6.4653 | 0.0699 | | |
| *20 | 2.7234 | 0.8138 | 1.58313 | 59.46 |
| *21 | −3.5848 | 0.0761 | | |
| 22 | −35.0929 | 0.9318 | 1.80518 | 25.42 |
| 23 | 2.3992 | 0.0062 | | |
| 24 | 2.4740 | 0.9209 | 1.48749 | 70.23 |
| 25 | −2.4740 | 3.5719 | | |
| 26 | ∞ | 0.1631 | 1.51633 | 64.14 |
| 27 | ∞ | 0.1087 | | |

TABLE 6

| | Example 3 | | | |
|---|---|---|---|---|
| Si | 1 | 2 | 20 | 21 |
| KA | −1.0000009E+01 | −5.2638545E+00 | 1.0000000E+00 | 1.0000000E+00 |
| A3 | 1.9340110E−03 | 4.1369731E−03 | — | — |
| A4 | 2.0320427E−03 | 3.3634457E−04 | −4.8692941E−03 | 1.7839421E−02 |
| A5 | −3.0220332E−04 | 6.1041369E−04 | — | — |
| A6 | 2.2675340E−06 | −7.9183717E−05 | 9.2232103E−04 | 1.5506364E−03 |
| A7 | 3.2123121E−06 | −1.1271346E−05 | — | — |
| A8 | −2.4746990E−07 | 7.3177322E−07 | 1.1796139E−03 | −1.1658453E−03 |
| A9 | 4.1804611E−09 | 1.9903577E−07 | — | — |
| A10 | −2.2474383E−09 | −1.8215995E−08 | 1.5599362E−03 | 3.2966511E−03 |
| A11 | 5.2720664E−10 | 8.9934583E−10 | | |
| A12 | −2.8918570E−11 | −5.9375786E−11 | | |

TABLE 7

Example 4 (Projection Distance: 200)

| Si | Ri | Di | Ndj | νdj |
|---|---|---|---|---|
| *1 | 11.0683 | 0.7074 | 1.49100 | 57.58 |
| *2 | 3.5564 | 3.4790 | | |
| 3 | 9.2249 | 0.3144 | 1.80610 | 33.27 |
| 4 | 2.8450 | 1.2196 | | |
| 5 | 4.1481 | 0.3146 | 1.67790 | 55.34 |
| 6 | 2.3362 | 1.5973 | | |
| 7 | −4.6452 | 1.4758 | 1.62041 | 60.29 |
| 8 | 5.3300 | 0.1806 | | |
| 9 | 7.3824 | 1.0522 | 1.62588 | 35.70 |
| 10 | −6.8256 | 0.0315 | | |
| 11 | 3.4847 | 1.5721 | 1.54072 | 47.23 |
| 12 | −14.0652 | 1.9941 | | |
| 13 | −4.5157 | 0.1888 | 1.80400 | 46.58 |
| 14 | 7.3753 | 0.0316 | | |
| *15 | 3.6443 | 0.9434 | 1.58313 | 59.46 |
| *16 | −3.6841 | 0.1487 | | |
| 17 | 5.4066 | 0.7281 | 1.48749 | 70.23 |
| 18 | −2.2312 | 0.0158 | | |
| 19 | −5.4726 | 0.1886 | 1.90366 | 31.32 |
| 20 | 2.8401 | 0.0314 | | |
| 21 | 3.0591 | 0.8872 | 1.49700 | 81.54 |
| 22 | −2.7336 | 2.9869 | | |
| 23 | ∞ | 0.1651 | 1.51633 | 64.14 |
| 24 | ∞ | 0.1572 | | |

TABLE 8

Example 4

| Si | 1 | 2 | 15 | 16 |
|---|---|---|---|---|
| KA | −5.3152503E+00 | −4.1819759E−06 | 1.0000000E+00 | 1.0000000E+00 |
| A3 | 1.1930300E−02 | 1.8996373E−02 | — | — |
| A4 | −1.9946283E−03 | −2.9852069E−03 | −2.0380440E−02 | 1.9938452E−02 |
| A5 | −1.4350875E−05 | −1.6900900E−04 | — | — |
| A6 | 4.2561790E−05 | −4.1570218E−05 | −2.8532257E−03 | 5.4627405E−03 |
| A7 | −1.5653180E−06 | 3.8920747E−06 | — | — |
| A8 | −2.4953421E−07 | 5.2712891E−07 | −1.4086324E−04 | −6.0925453E−03 |
| A9 | 5.5423180E−10 | 1.1725887E−07 | — | — |
| A10 | 2.5320293E−09 | −1.6005831E−08 | −2.9931843E−03 | 2.3244323E−03 |

TABLE 9

Example 5 (Projection Distance: 145)

| Si | Ri | Di | Ndj | νdj |
|---|---|---|---|---|
| *1 | −2.4410 | 0.7757 | 1.49100 | 57.58 |
| *2 | −4.8551 | 1.3268 | | |
| 3 | 12.1084 | 0.3051 | 1.70154 | 41.24 |
| 4 | 2.6236 | 1.4198 | | |
| 5 | −22.0583 | 0.2179 | 1.63854 | 55.38 |
| 6 | 2.5952 | 2.3558 | | |
| 7 | 18.5908 | 0.2179 | 1.63854 | 55.38 |
| 8 | 3.7451 | 0.9278 | 1.62004 | 36.26 |
| 9 | −11.1601 | 0.1646 | | |
| 10 | 2.8442 | 1.3349 | 1.51742 | 52.43 |
| 11 | −17.7385 | 1.2984 | | |
| 12 | −3.7812 | 0.1743 | 1.83481 | 42.73 |
| 13 | 3.9250 | 0.0405 | | |
| *14 | 2.0280 | 0.8538 | 1.58313 | 59.46 |
| *15 | −3.3495 | 0.1222 | | |
| 16 | 11.9311 | 0.5627 | 1.49700 | 81.54 |
| 17 | −1.6839 | 0.0291 | | |
| 18 | −2.4050 | 0.1453 | 1.83400 | 37.16 |
| 19 | 3.2735 | 0.7133 | 1.49700 | 81.54 |
| 20 | −1.9744 | 2.8609 | | |
| 21 | ∞ | 0.1525 | 1.51633 | 64.14 |
| 22 | ∞ | 0.1620 | | |

TABLE 10

Example 5

| Si | 1 | 2 | 14 | 15 |
|---|---|---|---|---|
| KA | 0.0000000E+00 | 0.0000000E+00 | 7.0243215E−01 | −1.8201517E+00 |
| A3 | 7.1321304E−02 | 7.6068846E−02 | — | — |
| A4 | 1.8140593E−02 | −1.3803933E−03 | −7.0437671E−03 | 5.8478488E−02 |
| A5 | −1.3147468E−02 | −3.4702252E−04 | — | — |
| A6 | 2.1752550E−03 | −4.3248893E−04 | −8.8449961E−03 | 1.0772767E−02 |

TABLE 10-continued

Example 5

| Si | 1 | 2 | 14 | 15 |
|---|---|---|---|---|
| A7 | 8.1168490E−05 | −5.2333240E−05 | — | — |
| A8 | −2.8798139E−05 | 1.0248983E−05 | 1.2311124E−01 | −1.9305377E−02 |
| A9 | −5.4268586E−06 | 3.6093829E−06 | — | — |
| A10 | 6.5145410E−08 | 1.0013731E−06 | −2.7055496E−01 | 3.5913920E−01 |
| A11 | 1.4343865E−07 | −7.8314341E−08 | — | — |
| A12 | 2.2322755E−08 | −1.4918061E−08 | 2.2131035E−01 | −9.8338222E−01 |
| A13 | 4.7702575E−09 | −6.1969020E−09 | — | — |
| A14 | −2.6524152E−09 | 3.6199429E−10 | 1.3981770E−02 | 1.1313234E+00 |
| A15 | 2.9538462E−10 | −1.4834477E−09 | — | — |
| A16 | −4.2987997E−11 | 1.7882098E−10 | −8.2294199E−02 | −4.8463311E−01 |
| A17 | 7.8571347E−13 | 2.4340040E−11 | | |
| A18 | 3.4514891E−13 | 4.9399940E−12 | | |
| A19 | 2.4449731E−13 | 7.3225666E−13 | | |
| A20 | −3.3445492E−14 | −3.5979861E−13 | | |

TABLE 11

Example 6 (Projection Distance: 144)

| Si | Ri | Di | Ndj | ν dj |
|---|---|---|---|---|
| *1 | 38.1469 | 0.6497 | 1.49100 | 57.58 |
| *2 | 4.5086 | 2.5013 | | |
| 3 | 10.7695 | 0.3609 | 1.70154 | 41.24 |
| 4 | 2.4660 | 1.2936 | | |
| 5 | −42.4707 | 0.2887 | 1.71299 | 53.87 |
| 6 | 2.3923 | 1.1489 | | |
| 7 | −28.0829 | 0.2181 | 1.61800 | 63.33 |
| 8 | 4.0173 | 1.0343 | 1.62004 | 36.26 |
| 9 | −7.0176 | 0.5538 | | |
| 10 | 2.7523 | 1.0880 | 1.51742 | 52.43 |
| 11 | −11.1424 | 1.5830 | | |
| 12 | −2.8060 | 0.1733 | 1.83481 | 42.73 |
| 13 | 11.1670 | 0.0144 | | |
| *14 | 2.3657 | 0.7644 | 1.58313 | 59.38 |
| *15 | −4.0844 | 0.0682 | | |
| 16 | 5.5539 | 0.7888 | 1.49700 | 81.54 |
| 17 | −2.0835 | 0.0145 | | |
| 18 | −4.5623 | 0.1732 | 1.83400 | 37.16 |
| 19 | 2.3503 | 0.8975 | 1.49700 | 81.54 |
| 20 | −2.5022 | 2.6767 | | |
| 21 | ∞ | 0.1516 | 1.51633 | 64.14 |
| 22 | ∞ | 0.1602 | | |

TABLE 12

Example 6

| Si | 1 | 2 | 14 | 15 |
|---|---|---|---|---|
| KA | 0.0000000E+00 | 0.0000000E+00 | −2.6825179E+00 | −1.1644172E+01 |
| A3 | 2.7394133E−02 | 3.3118550E−02 | 4.5684585E−03 | 3.7767220E−04 |
| A4 | −5.2227148E−03 | −5.2635053E−03 | 2.7740776E−02 | 5.8118488E−02 |
| A5 | 6.8699058E−05 | −7.6433672E−04 | 1.9671707E−02 | −2.7708325E−02 |
| A6 | 1.0524034E−04 | 4.9156881E−05 | 4.7429657E−03 | 2.7770219E−02 |
| A7 | 5.8828712E−06 | 6.7869872E−05 | 1.1956495E−03 | 5.2798164E−02 |
| A8 | −2.4424967E−06 | −1.8042280E−06 | 4.4382448E−03 | 1.2063789E−02 |
| A9 | −8.8468824E−08 | 7.8568031E−08 | −1.9444600E−03 | −3.7810755E−02 |
| A10 | 4.2075402E−08 | −2.7139906E−07 | −1.5061066E−02 | −3.9427951E−02 |
| A11 | −5.4014777E−09 | −9.9755864E−08 | 1.1584369E−02 | −1.4178315E−03 |
| A12 | 2.7764560E−09 | −1.5143390E−08 | −6.7056176E−03 | 4.1981393E−02 |
| A13 | 3.8625505E−09 | 4.6341517E−09 | 8.3783926E−04 | 2.8874266E−02 |
| A14 | −2.4956801E−09 | 1.7538277E−09 | 1.7796847E−03 | −6.6166708E−03 |
| A15 | 5.0223970E−10 | −1.2617058E−09 | 3.1420314E−02 | −2.2411255E−02 |
| A16 | −3.6089758E−11 | 1.8806857E−10 | −2.8407592E−02 | 3.8658176E−03 |
| A17 | −2.2318116E−14 | 7.5179310E−12 | −1.1637750E−03 | −5.4688710E−03 |
| A18 | 5.8668226E−14 | 2.1559611E−12 | −9.6766879E−04 | −3.1481004E−03 |
| A19 | 2.3259212E−14 | 7.1352019E−14 | 1.3651322E−03 | 6.5893949E−04 |
| A20 | −3.8101803E−15 | −1.5558458E−13 | 1.3531295E−03 | 2.7648565E−03 |

Table 13 shows specs and values related to the conditional expressions for each of Examples 1 to 6. In the Table 13, "FNo." represents the F-number, "2ω" represents the total angle of view, and "θ" represents the angle formed between the maximum upper side ray 5u at the maximum angle of view and the maximum lower side ray 5s at the maximum angle of view. Here, degree is used as the unit of angle. For Xf (y) and Xr (y), values at three representative heights, y=0.5, y=0.75, and y=1.0, are provided. The sign of dexp is negative if the reduction side pupil position is on the magnification side of the reduction side conjugate position.

Figure 9:
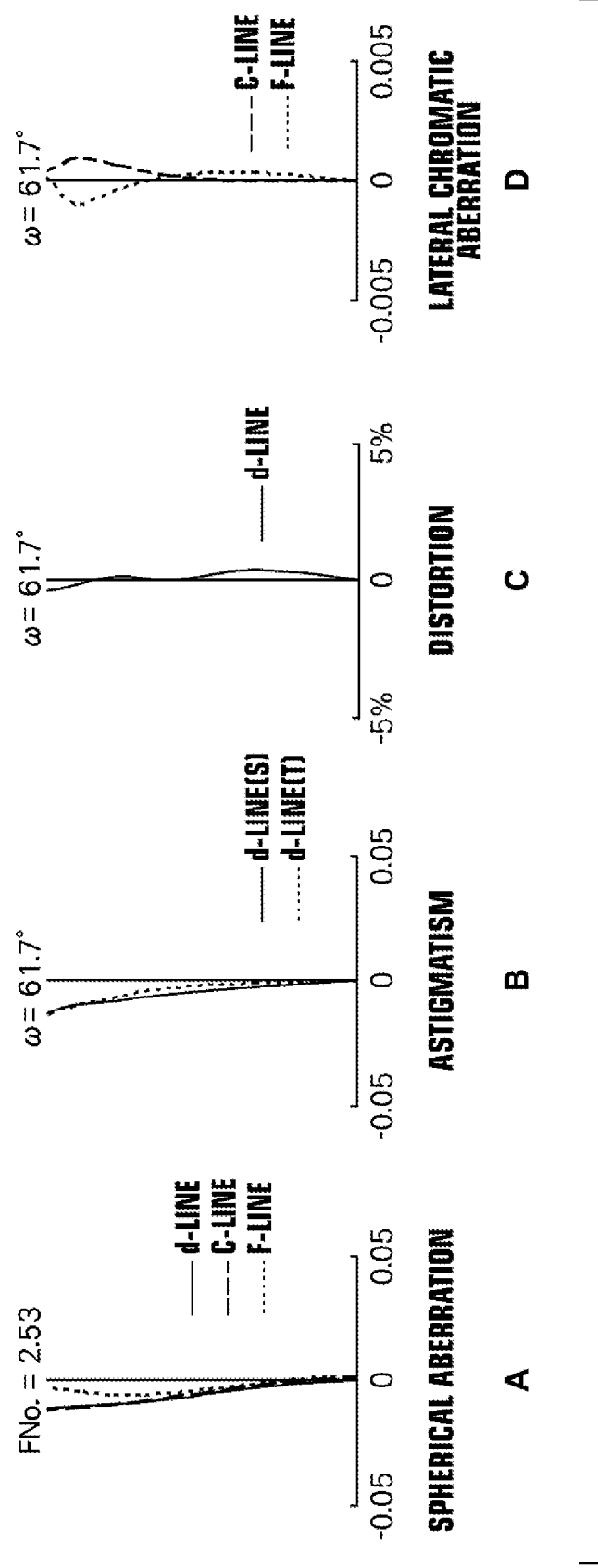
FIG. 9 shows aberration diagrams of the projection lens according to Example 1 of the present invention, in which the diagrams A, B, C, and D illustrate spherical aberration, astigmatism, distortion, and lateral chromatic aberration respectively.

9 is with respect to the d-line (wavelength of 587.6 nm), but the spherical aberration diagram also illustrates aberrations with respect to the F-line (wavelength of 486.1 nm) and C-line (wavelength of 656.3 nm), and the lateral chromatic aberration diagram illustrates aberrations with respect to the F-line and the C-line. In the astigmatism diagram, the solid line illustrates astigmatism in the sagittal direction while the dotted line illustrates astigmatism in the tangential direction, which are denoted by the symbols (S) and (T) appended to the line type descriptions. The "Fno." in the spherical aberration diagram represents the F-number and the "ω" in the other aberration diagrams represents the half angle of view. Further, each of aberration diagrams A to D in FIG. 9 shows aberration when the focal length of the entire system is normalized to the value of 1 and at the projection distance indicated on the upper side of the drawing.

TABLE 13

|  | Example 1 | Example 2 | Example 3 | Example 4 | Example 5 | Example 6 |
|---|---|---|---|---|---|---|
| f | 1.000 | 1.000 | 1.000 | 1.000 | 1.000 | 1.000 |
| Bf | 3.948 | 3.783 | 3.782 | 3.248 | 3.112 | 2.930 |
| FNo. | 2.53 | 2.42 | 2.41 | 2.43 | 2.60 | 2.60 |
| 2 ω | 123.4 | 123.0 | 123.0 | 124.0 | 117.4 | 117.2 |
| hfa | 0.941 | 0.981 | 0.981 | 0.817 | 0.722 | 0.727 |
| hfb | −0.392 | −0.265 | −0.265 | 0.081 | −0.006 | 0.060 |
| hra | 0.909 | 0.963 | 0.963 | 0.852 | 0.718 | 0.721 |
| hrb | −0.143 | −0.055 | −0.055 | 0.363 | 0.234 | 0.274 |
| Xf(0.5) | −0.00019 | −0.00025 | −0.00025 | −0.00058 | −0.00019 | 0.00024 |
| Xf(0.75) | −0.00094 | −0.00105 | −0.00105 | −0.00305 | −0.00076 | 0.00129 |
| Xf(1.0) | −0.00241 | −0.00151 | −0.00151 | −0.01034 | −0.00169 | 0.00499 |
| Xr(0.5) | 0.00106 | 0.00098 | 0.00098 | 0.00058 | 0.00115 | 0.00131 |
| Xr(0.75) | 0.00533 | 0.00511 | 0.00512 | 0.00299 | 0.00615 | 0.00686 |
| Xr(1.0) | 0.01743 | 0.01796 | 0.01798 | 0.0096 | 0.02126 | 0.02346 |
| NdA | 1.58313 | 1.58313 | 1.58313 | 1.58313 | 1.58313 | 1.58313 |
| ν dA | 59.46 | 59.46 | 59.46 | 59.46 | 59.46 | 59.46 |
| Im φ | 3.767 | 3.759 | 3.758 | 3.804 | 3.312 | 3.292 |
| dexp | −4.821 | −5.106 | −5.098 | −6.435 | −5.416 | −5.718 |
| fA | 2.596 | 2.787 | 2.786 | 3.298 | 2.301 | 2.686 |
| α A | 7.0 | 7.0 | 7.0 | 7.0 | 7.0 | 7.0 |
| L | 20.247 | 20.150 | 20.384 | 17.102 | 12.986 | 13.615 |
| fpa | −14.192 | −15.048 | −15.044 | −11.014 | −11.182 | −10.480 |
| fGR | 5.116 | 5.034 | 5.159 | 4.427 | 4.684 | 4.158 |
| θ | 13.84 | 12.94 | 12.99 | 12.46 | 12.00 | 13.71 |

Table 14 shows values of each of Examples 1 to 6 corresponding to the conditional expressions (1) to (12). For the values corresponding to the conditional expression (3), values at three representative heights, y=0.5, y=0.75, and y=1.0, are provided.

TABLE 14

| Formula |  | Example 1 | Example 2 | Example 3 | Example 4 | Example 5 | Example 6 |
|---|---|---|---|---|---|---|---|
| (1) | \| hfb/hfa \| | 0.417 | 0.270 | 0.270 | 0.099 | 0.009 | 0.083 |
| (2) | \| hrb/hra \| | 0.157 | 0.057 | 0.057 | 0.426 | 0.326 | 0.380 |
| (3) | (Xr(0.5) − Xf(0.5))/f | 0.00124 | 0.00122 | 0.00122 | 0.00116 | 0.00134 | 0.00107 |
|  | (Xr(0.75) − Xf(0.75))/f | 0.00627 | 0.00616 | 0.00616 | 0.00604 | 0.00691 | 0.00557 |
|  | (Xr(1.0) − Xf(1.0))/f | 0.01984 | 0.01947 | 0.01949 | 0.01994 | 0.02295 | 0.01848 |
| (4) | NdA | 1.58313 | 1.58313 | 1.58313 | 1.58313 | 1.58313 | 1.58313 |
| (5) | ν dA | 59.46 | 59.46 | 59.46 | 59.46 | 59.46 | 59.46 |
| (6) | Bf/f | 3.948 | 3.783 | 3.782 | 3.248 | 3.112 | 2.930 |
| (7) | \| Im φ/dexp \| | 0.781 | 0.736 | 0.737 | 0.591 | 0.612 | 0.576 |
| (8) | fA/f | 2.596 | 2.787 | 2.786 | 3.298 | 2.301 | 2.686 |
| (9) | α A | 7.0 | 7.0 | 7.0 | 7.0 | 7.0 | 7.0 |
| (10) | Bf × Im φ × tan(ω) / f × L | 1.364 | 1.300 | 1.284 | 1.359 | 1.304 | 1.158 |
| (11) | \| f/fpa \| | 0.0705 | 0.0665 | 0.0665 | 0.0908 | 0.0894 | 0.0954 |
| (12) | fGR/f | 5.116 | 5.034 | 5.159 | 4.427 | 4.684 | 4.158 |

Figure 10:
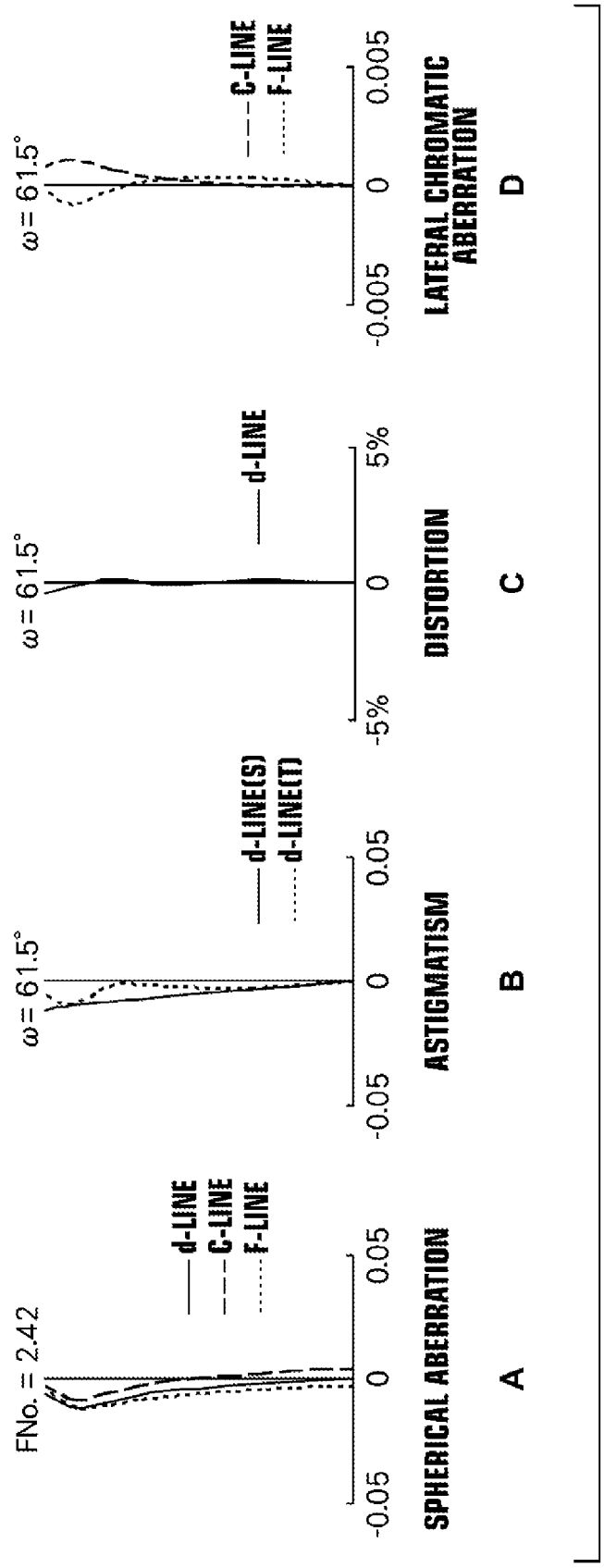
FIG. 10 shows aberration diagrams of the projection lens according to Example 2 of the present invention, in which the diagrams A, B, C, and D illustrate spherical aberration, astigmatism, distortion, and lateral chromatic aberration respectively.
Figure 11:
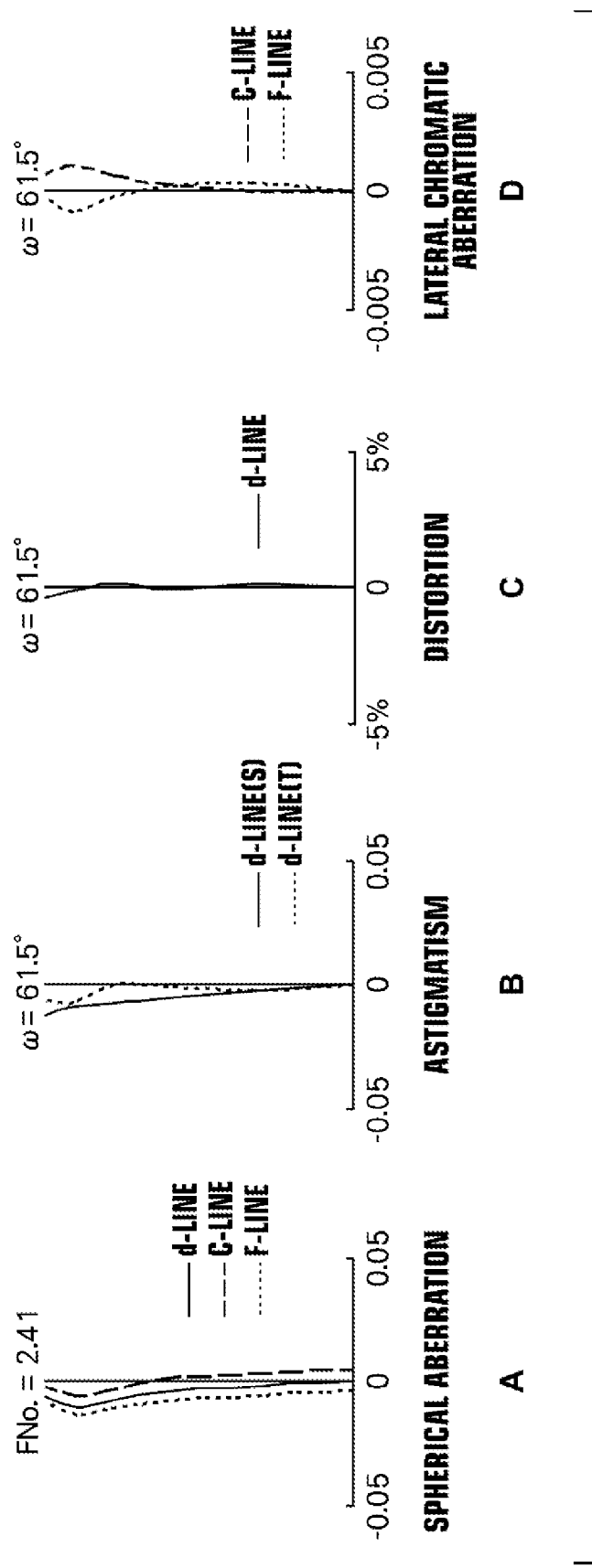
FIG. 11 shows aberration diagrams of the projection lens according to Example 3 of the present invention, in which the diagrams A, B, C, and D illustrate spherical aberration, astigmatism, distortion, and lateral chromatic aberration respectively.
Figure 12:
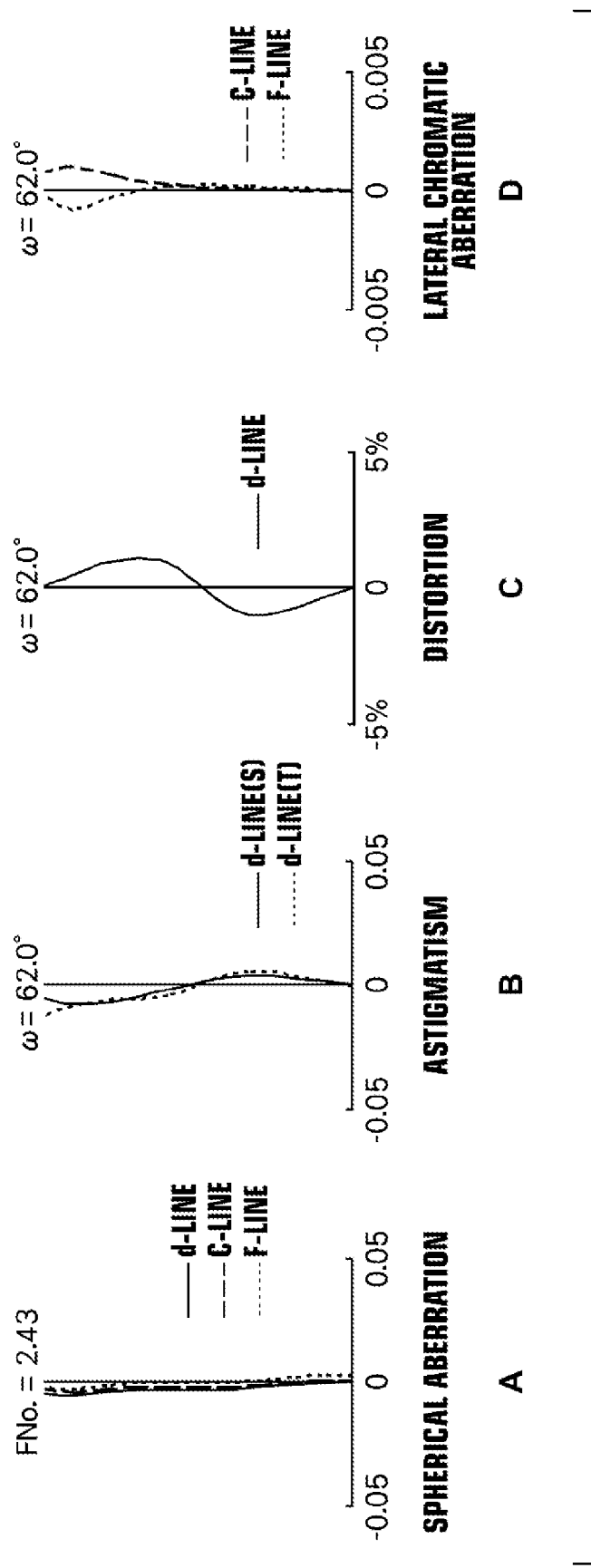
FIG. 12 shows aberration diagrams of the projection lens according to Example 4 of the present invention, in which the diagrams A, B, C, and D illustrate spherical aberration, astigmatism, distortion, and lateral chromatic aberration respectively.
Figure 13:
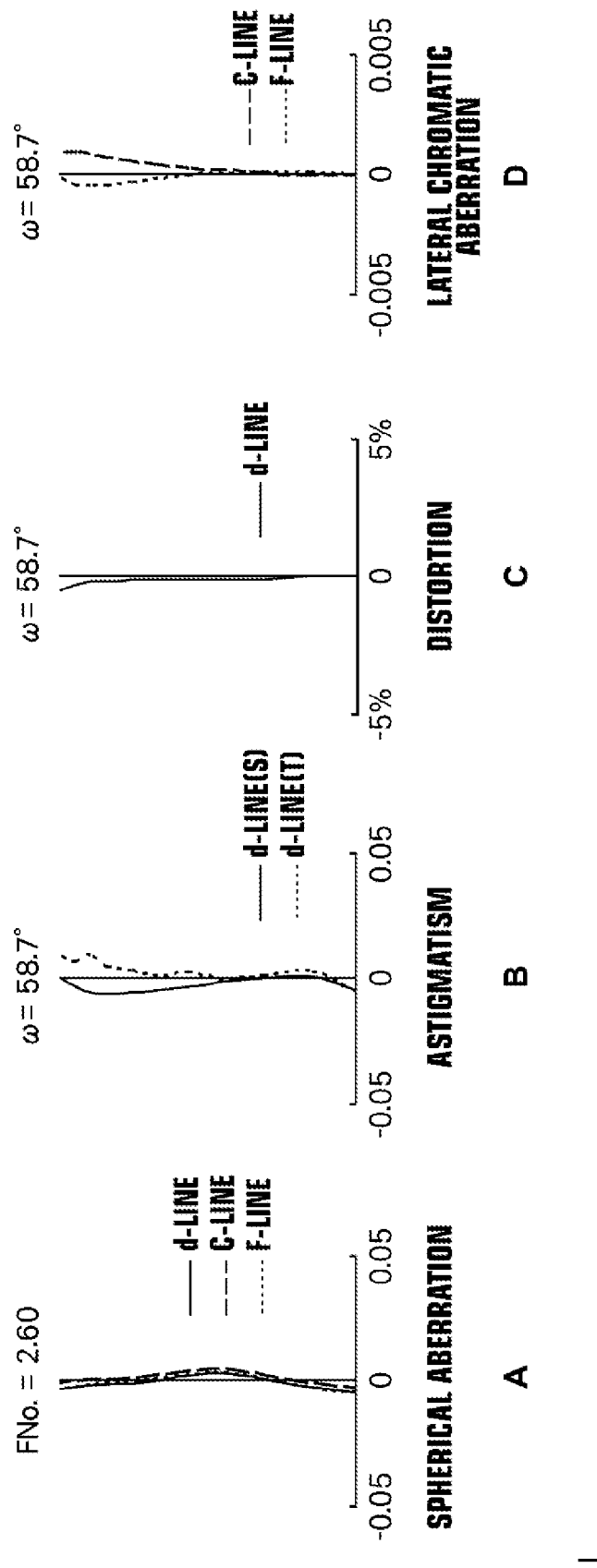
FIG. 13 shows aberration diagrams of the projection lens according to Example 5 of the present invention, in which the diagrams A, B, C, and D illustrate spherical aberration, astigmatism, distortion, and lateral chromatic aberration respectively.
Figure 14:
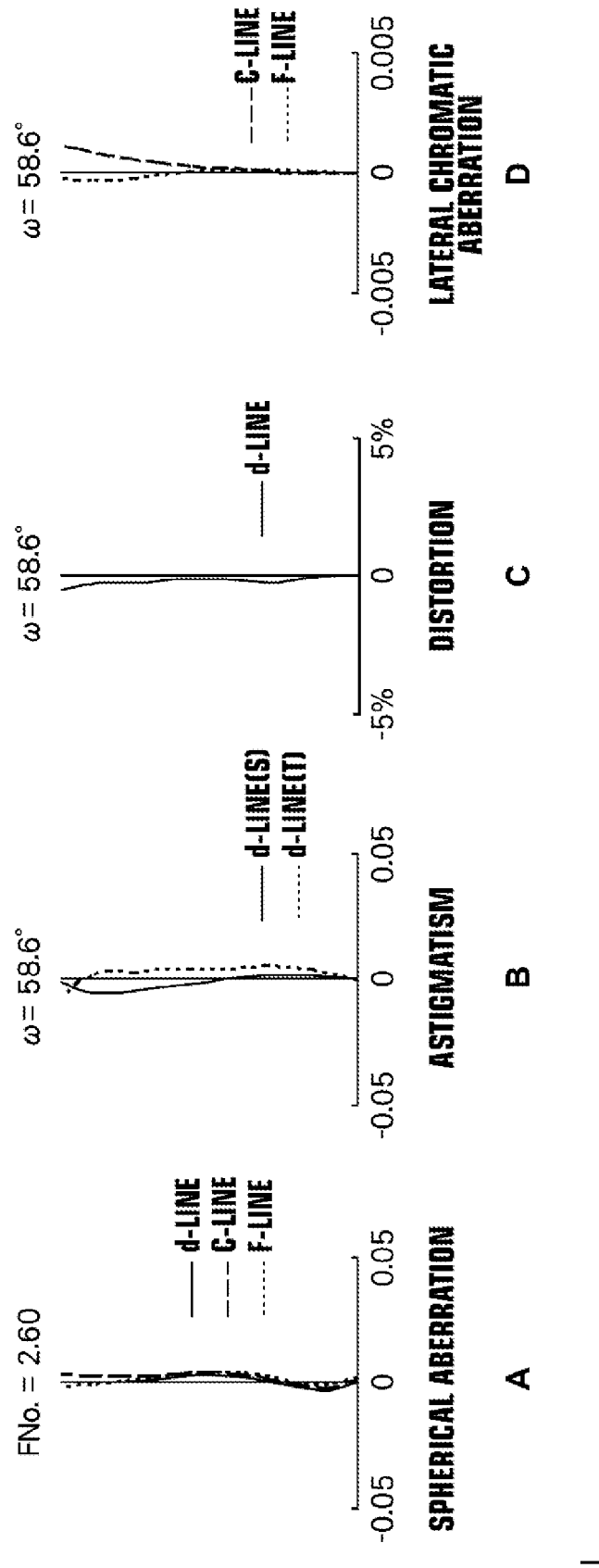
FIG. 14 shows aberration diagrams of the projection lens according to Example 6 of the present invention, in which the diagrams A, B, C, and D illustrate spherical aberration, astigmatism, distortion, and lateral chromatic aberration respectively.

Diagrams of spherical aberration, astigmatism, distortion, and lateral chromatic aberration (chromatic aberration of magnification) of Example 1 are illustrated respectively in A to D of FIG. 9. Each of aberration diagrams of A to D of FIG. Likewise, aberration diagrams of the projection lenses of Examples 2 to 6 are shown in A to D of FIG. 10, A to D of FIG. 11, A to D of FIG. 12, A to D of FIG. 13, and A to D of FIG. 14 respectively.

As is known from the data shown above, the projection lenses of Examples 1 to 6 are non-telecentric on the reduction side, achieved a wide angle of view in the range of total angle of view from about 110° to 130°, have a small F-number of 2.6, and have high optical performance with well corrected aberrations, while being formed compact with a short length from the most magnification side lens surface to the most reduction side lens surface on the optical axis and a small lens diameter on the reduction side, and at low cost with only two aspherical lenses included in the entire system.

So far the present invention has been described by way of the embodiments and Examples, but it should be understood that the projection lens of the present invention is not limited to the Examples described above, and various changes and modifications may be made. For example, values of radius of curvature of each lens, surface spacing, refractive index, Abbe number, aspherical surface coefficient may be changed, as appropriate.

Further, the projection display apparatus of the present invention is not limited to that having the aforementioned configuration. For example, the light valve and optical members used for separating or combining a luminous flux are not limited to those described above, and various changes and modifications may be made to the embodiment.

What is claimed is:

1. A projection lens that projects image information displayed on the reduction side conjugate position onto the magnification side conjugate position, the projection lens
comprising an aspherical lens having a positive refractive power that simultaneously satisfies conditional expressions (1) to (5) given below, and
satisfying conditional expressions (6) and (7) given below:

$$|hfb/hfa| < 0.8 \quad (1)$$

$$|hrb/hra| < 0.8 \quad (2)$$

$$0 < (Xr(y) - Xf(y))/f \quad (3)$$

$$NdA < 1.65 \quad (4)$$

$$50 < vdA < 62 \quad (5)$$

$$Bf/f > 2 \quad (6)$$

$$0.5 < |Im\phi/dexp| < 1 \quad (7)$$

where:
hfa is the maximum height of axial ray on the magnification side surface of the aspherical lens;
hfb is the height of principal ray on the magnification side surface of the aspherical lens at the maximum angle of view;
hra is the maximum height of axial ray on the reduction side surface of the aspherical lens;
hrb is the height of principal ray on the reduction side surface of the aspherical lens at the maximum angle of view;
Xf(y) is the difference in an optical axis direction between the magnification side surface of the aspherical lens and its paraxial spherical surface at a height y;
Xr(y) is the difference in an optical axis direction between the reduction side surface of the aspherical lens and its paraxial spherical surface at a height y;
NdA is the refractive index of the aspherical lens at the d-line;
vdA is the d-line based Abbe number;
Bf is the back focus of the entire system when the reduction side is taken as the back side;
f is the focal length of the entire system;
Im$\phi$ is the maximum effective image circle diameter on the reduction side; and
dexp is the distance from the reduction side conjugate position to the reduction side pupil position, in which
y is the height from the optical axis and is any arbitrary value within a range of $0.5 \leq y \leq 1$ when the smaller one of the hfa and hra is taken as 1; and
the sign of Xf(y) and Xr(y) is positive if each surface of the aspherical lens is on the reduction side of its paraxial spherical surface and negative if it is on the magnification side.

2. The projection lens as claimed in claim 1 wherein, when the spacing between adjacent lenses is taken as di and the focal length of the entire system is taken as f, an aspherical lens on the reduction side of the most reduction side lens spacing that satisfies di/f>0.8 is only the aspherical lens that satisfies the conditional expressions (1) to (5).

3. The projection lens as claimed in claim 1, wherein the projection lens satisfies a conditional expression given below:

$$1 < fA/f < 5 \quad (8)$$

where fA is the focal length of the aspherical lens.

4. The projection lens as claimed in claim 1, wherein the projection lens satisfies a conditional expression (9) given below:

$$\alpha A < 10 \times 10^{-6} \quad (9)$$

where $\alpha A$ is the linear expansion coefficient (unit $K^{-1}$) of the aspherical lens at 20° C.

5. The projection lens as claimed in claim 1, wherein the projection lens satisfies a conditional expression (4') given below:

$$NdA < 1.60 \quad (4')$$

6. The projection lens as claimed in claim 1, wherein the projection lens satisfies a conditional expression (5') given below:

$$55 < vdA < 62 \quad (5')$$

7. The projection lens as claimed in claim 1, wherein the projection lens satisfies a conditional expression (8°) given below:

$$2 < fA/f < 3.5 \quad (8')$$

where fA is the focal length of the aspherical lens.

8. The projection lens as claimed in claim 1, wherein the projection lens satisfies conditional expressions (1') and (2') given below:

$$|hfb/hfa| < 0.5 \quad (1')$$

$$|hrb/hra| < 0.5 \quad (2')$$

9. The projection lens as claimed in claim 1, wherein the projection lens satisfies a conditional expression (10) given below:

$$Bf \times Im\phi \times \tan(\omega)/(f \times L) > 1.0 \quad (10)$$

where:
$\omega$ is the half angle of view; and
L is the length from the most magnification side lens surface to the most reduction side lens surface on the optical axis.

10. The projection lens as claimed in claim 9, wherein the projection lens satisfies a conditional expression (10') given below:

$$Bf \times Im\phi \times \tan(\omega)/(f \times L) > 1.2 \quad (10')$$

11. The projection lens as claimed in claim 1, wherein the projection lens comprises an aspherical plastic lens disposed on the most magnification side and satisfies a conditional expression (11) given below:

$$|f/fpa| < 0.1 \quad (11)$$

where fpa is the focal length of the aspherical plastic lens disposed on the most magnification side.

12. The projection lens as claimed in claim 1, wherein the projection lens satisfies a conditional expression (12) given below when the spacing between adjacent lenses is taken as di, the focal length of the entire system is taken as f, and the lens group substantially consisting of all lenses located on the reduction side of the most reduction side spacing that satisfies di/f>0.8 is taken as a rear group:

$$4 < fGR/f < 6 \quad (12)$$

where fGR is the focal length of the rear group.

13. The projection lens as claimed in claim 1, wherein, when the spacing between adjacent lenses is taken as di, the focal length of the entire system is taken as f, and the lens group substantially consisting of all lenses located on the magnification side of the most reduction side spacing that satisfies di/f>0.8 is taken as a front group, the front group comprises an aspherical plastic lens, a negative meniscus lens with a convex surface on the magnification side, and a negative lens disposed in order from the magnification side.

14. The projection lens as claimed in claim 13, wherein the front group comprises an aspherical plastic lens, a negative meniscus lens with a convex surface on the magnification side, a negative lens, a negative lens, and a positive lens disposed in order from the magnification side.

15. A projection display apparatus, comprising a light source, a light valve that receives light from the light source, the projection lens as claimed in claim 1 as a projection lens for projecting an optical image of light optically modulated by the light valve onto a screen.

\* \* \* \* \*